United States Patent

Inagaki et al.

[11] Patent Number: 5,297,177
[45] Date of Patent: Mar. 22, 1994

[54] FUEL ASSEMBLY, COMPONENTS THEREOF AND METHOD OF MANUFACTURE

[75] Inventors: Masahisa Inagaki, Hitachi; Masayoshi Kanno, Kitaibaraki; Hiromasa Hirakawa, Hitachi; Hideaki Ishizaki, Mito; Nobukazu Yamamoto, Hitachi; Hideo Maki, Katsuta; Junjiro Nakajima, Hitachi; Shozo Nakamura, Hitachiota; Satoshi Kanno, Hitachi, all of Japan

[73] Assignee: Hitachi, Ltd., Tokyo, Japan

[21] Appl. No.: 948,030

[22] Filed: Sep. 21, 1992

[30] Foreign Application Priority Data

Sep. 20, 1991 [JP] Japan ............... 3-241674

[51] Int. Cl.$^5$ ............................... G21C 3/34
[52] U.S. Cl. ..................... 376/462; 376/457; 376/438
[58] Field of Search ............ 376/457, 434, 462, 438, 376/441, 442; 72/367, 700; 420/422

[56] References Cited

U.S. PATENT DOCUMENTS

| | | | |
|---|---|---|---|
| 3,689,324 | 9/1972 | Wiener et al. | 376/457 |
| 3,865,635 | 2/1975 | Hofvenstam et al. | 148/11.5 F |
| 4,172,742 | 10/1979 | Rowecliffe et al. | 148/38 |
| 4,238,251 | 12/1980 | Williams et al. | 148/133 |
| 4,297,135 | 10/1981 | Giessen et al. | 75/123 |
| 4,678,521 | 7/1987 | Yoshida et al. | 148/11.5 F |
| 4,689,091 | 8/1987 | Yoshida et al. | 148/11.5 F |
| 4,718,949 | 1/1988 | Takase et al. | 148/11.5 F |
| 4,749,543 | 6/1988 | Crowther et al. | 376/463 |
| 4,765,174 | 8/1988 | Cook et al. | 72/367 |
| 4,810,461 | 3/1989 | Inagaki et al. | 376/457 |
| 4,863,679 | 9/1989 | Imahashi et al. | 376/417 |
| 4,927,468 | 5/1990 | Johnson et al. | 148/3 |
| 4,938,921 | 7/1990 | Mardon et al. | 376/457 |
| 4,990,305 | 2/1991 | Foster et al. | 376/457 |
| 5,223,211 | 6/1993 | Inagaki et al. | 376/462 |

FOREIGN PATENT DOCUMENTS

| | | |
|---|---|---|
| 071193 | 7/1982 | European Pat. Off. |
| 227989 | 12/1986 | European Pat. Off. |
| 296972 | 6/1988 | European Pat. Off. |
| 425465 | 10/1990 | European Pat. Off. |
| 2951096 | 12/1979 | Fed. Rep. of Germany |
| 3703168 | 2/1987 | Fed. Rep. of Germany |
| 59-050144 | 3/1984 | Japan |
| 59-153874 | 9/1984 | Japan |
| 59-229475 | 12/1984 | Japan |
| 60-043450 | 3/1985 | Japan |
| 62-228442 | 10/1987 | Japan |
| 1-119650 | 5/1989 | Japan |
| 2118573 | 2/1983 | United Kingdom |

*Primary Examiner*—Donald P. Walsh
*Assistant Examiner*—Meena Chelliah
*Attorney, Agent, or Firm*—Antonelli, Terry, Stout & Kraus

[57] ABSTRACT

A fuel assembly, where crystallographic orientations of a channel box are brought into a random distribution; and cladding tubes, spacers and a channel box are made from highly corrosion-resistant, Fe—Ni, zirconium-based alloy, hardened in the ($\alpha+\beta$) phase or $\beta$-phase temperature region, has an average discharge burnup level of 50 to 550 GWd/t.

41 Claims, 11 Drawing Sheets

FIG. 5
FIG. 6
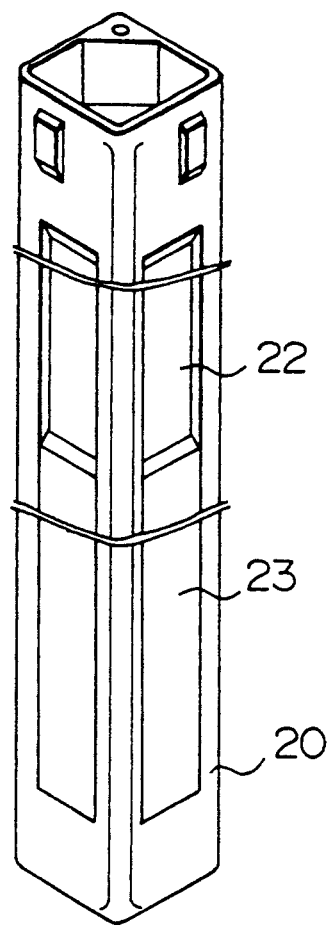
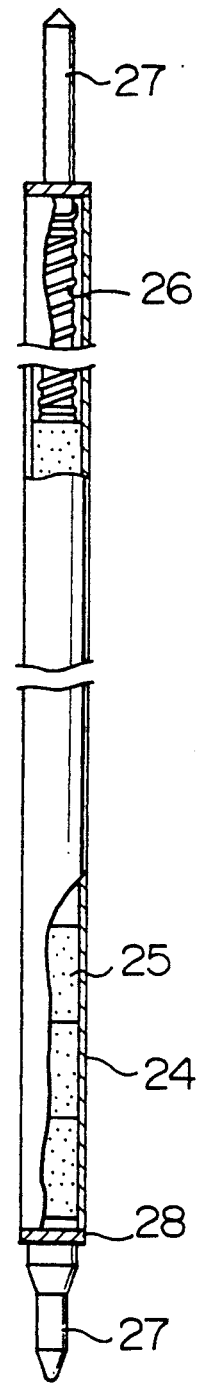

FIG. 7
FIG. 8
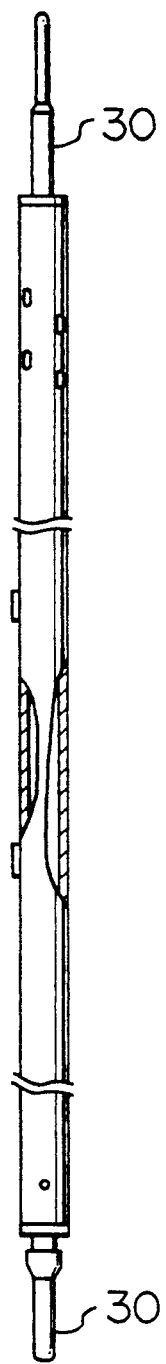
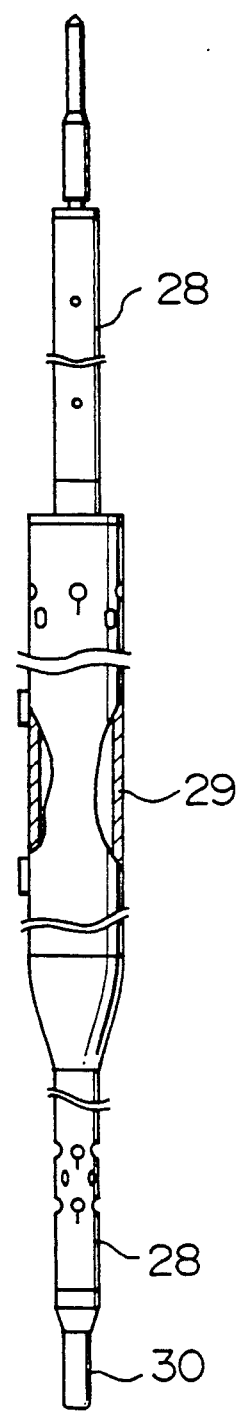

F I G. 11
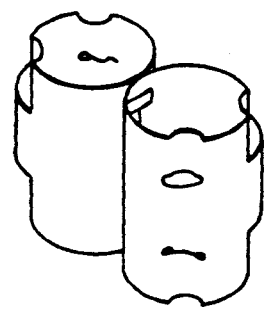
F I G. 12
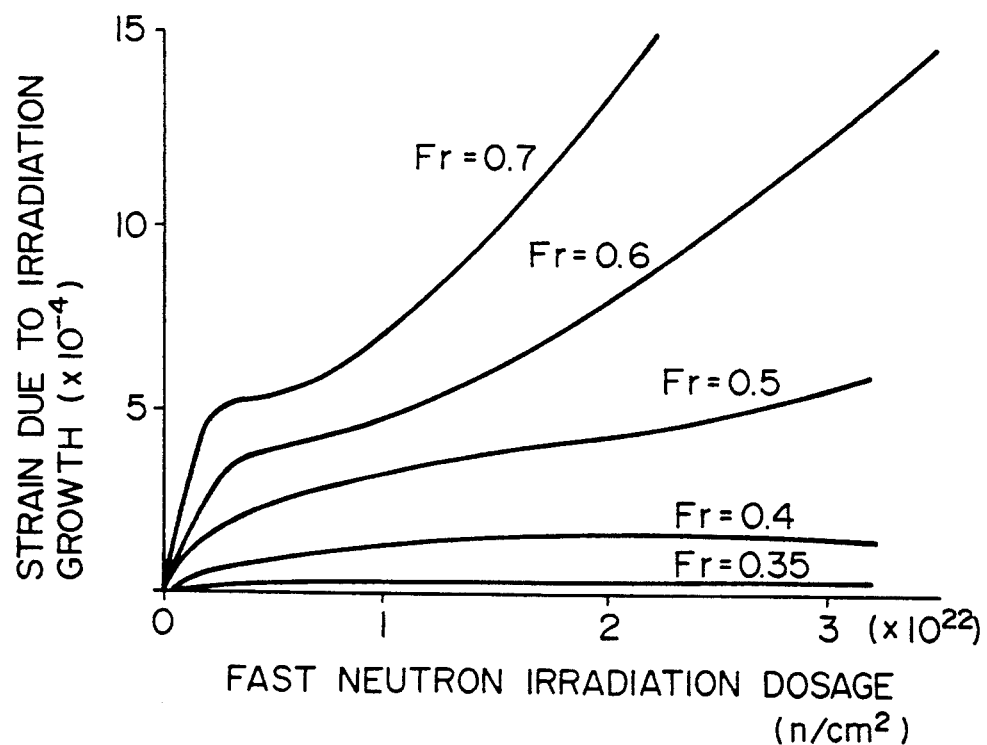

FUEL ASSEMBLY, COMPONENTS THEREOF AND METHOD OF MANUFACTURE

BACKGROUND OF THE INVENTION

The present invention relates to a fuel assembly for a light water reactor, and more particularly to a fuel assembly to be charged in a boiling water reactor.

Recent increasing interests are in longer operating cycles of light water reactors and higher burnup levels of uranium fuel, because of an increase in economical merits such as reduction in discharge of spent fuel, power generation cost, etc. Particularly in Japan, the atomic power generation is based on reprocessing of spent fuel as its premise, with keen requirements for higher burnup level, including reutilization of plutonium extracted by the reprocessing. The nuclear fuel is now discharged from the reaction at a burnup level (discharge burnup level) of about 30 GWd/t, and when a nuclear fuel can have a discharge burnup level of 60 GWd/t, the economical merit will be much improved. In order to attain a higher burnup level in light water reactors, it has been so far tried to improve the corrosion resistance of materials of members for a fuel assembly, prevent deformation of members of a fuel assembly in a neutron irradiation circumstance, optimize the enrichment and arrangement of uranium fuel, and improve the thermohydraulic characteristics of a fuel assembly.

A higher corrosion resistance is required for materials for a fuel assembly of high burnup level than for the conventional materials. As materials of members for the fuel assembly, a zircaloy (Zry: Zn—Sn—Fe—Cr—Ni alloy having the following composition: Sn: 1.2–1.7 wt. %, Fe: 0.07–0.24 wt. %, Cr: 0.05–0.15 wt. %, Ni: $<0.08$ wt. %, the balance being Zr and impurities) is now used. On the zircaloy members of a fuel assembly, local corrosion called "nodular corrosion" develops in the prevailing circumstance of the boiling water type, light water reactor (BWR). To prevent such a corrosion, processes of improving the corrosion resistance of zircaloy by heat treatment, for example, by heating it to an $(\alpha+\beta)$ phase or $\beta$-phase temperature region for a short time, followed by quenching, have been proposed (Japanese Patent Publications Nos. 61-45699 and 63-58223). Furthermore, a technique of improving the corrosion resistance by changing the alloy composition is known. For example, a zircaloy having higher Fe and Ni content is known [Japanese Patent Applications Kokai (Laid-open) Nos. 60-43450 and 62-228442].

The Zr alloy material is used in locations subjected t neutron irradiation and thus undergoes irradiation growth and deformation. Particularly, when a curving deformation or expansion deformation takes place at the channel box (FCB), clearances between FCB and control rod are decreased (e.g. to zero), resulting in nuclear reactor operation troubles. To prevent the deformations, a process for suppressing the irradiation growth by making the crystallographic orientation parameter, in the FCB longitudinal direction of (0002) face of hexagonal Zr crystal of 0.15 to 0.5, has been proposed in Japanese Patent Application Kokai (Laid-open) No. 59-229475.

In a boiling water type nuclear reactor, cooling water flows into clearances among fuel rods from the lower tie plate of a fuel assembly and is heated and boils, while passing through the clearances among the fuel rods from the bottom position upwards, to form a two-phase stream of steam voids and liquid water which flows out through through-holes of the upper tie plate. The void ratio is 0% at the bottom position of the fuel assembly and reaches about 70% at the top position. That is, a ratio of hydrogen atoms (H) to heavy metal atoms (U) (H/U ratio) differs between the bottom and the top of the fuel rods. At the bottom position of a fuel assembly, where the H/U ratio is high, the average neutron energy is lowered and the fission reaction of thermal neutrons with nuclear fuel substance is promoted, whereas at the top position of the fuel assembly where the H/U ratio is low, the fission reaction of neutrons with the nuclear fuel substance is suppressed. As a result, the linear heat rating is higher at the bottom position of the fuel assembly than at the top position of the fuel assembly, resulting in uneven power distribution in the axial direction of the fuel rods. Uneven power distribution occurs even in the radial direction of the fuel assembly. The outermost periphery of a square lattice arrangement of $8\times8$, $9\times9$ or $10\times10$ fuel rods is surrounded by an FCB to form a water gap between the outermost periphery of the fuel rods and the adjacent FCB. That is, the H/U ratio is higher at the outermost peripheral region of a fuel assembly than at the inner region thereof, and thus the linear heat rating will be higher. To attain a longer operating cycle and a higher burnup level of nuclear fuel, it is necessary to increase the uranium enrichment. In a fuel assembly having a higher uranium enrichment, such an uneven power distribution is more pronounced. In order to flatten the power distribution in the axial direction and the radial direction, optimization of shape and arrangement of water rods, optimization of uranium enrichment distribution, partial change of fuel rod length, prevention of local power peaking at the initial burnup period with burnable poisons such as Gd, B, etc., and the like have been carried out.

All the above-mentioned techniques relate to the so-called element techniques. Even if some element technique is distinguished, a fuel assembly of higher burnup level cannot be obtained when the fuel assembly partially has some inconvenience. For example, Japanese Patent Application Kokai (Laid-open) No. 59-229475 discloses that irradiation growth and curving deformation can be prevented by controlling an Fl value as a crystallographic orientation parameter of a channel box to 0.15–0.5; but among the crystallographic orientation parameters a crystallographic orientation parameter in the normal-to-plate direction (Fr value) is most important. Furthermore, the fuel rods undergo irradiation growth and are elongated more than the initial length. As a result, the following inconveniences appear. Since the bottom ends of the fuel rods are fixed to the lower tie plate, the elongated fuel rods push the upper tie plate upwards. Since the top end of the channel box is fixed to the upper tie plate and the bottom end of the channel box is inserted into the lower tie plate, the channel box is pushed upwards due to the irradiation growth of the fuel rods, and at the final burnup stage the length of fitting allowance between the lower tie plate and the channel box is considerably decreased. In the nuclear fuel for high burnup level, the irradiation growth of the fuel rods is so large that the channel box is pushed upwards beyond the length of fitting allowance between the lower tie plate and the channel box. This has been a problem.

SUMMARY OF THE INVENTION

An object of the present invention is to provide a fuel assembly for a higher burnup level.

In order to load the restricted space in a channel box with more than the predetermined amount of uranium, it is necessary to decrease the thickness of zirconium alloy members (such as fuel cladding tubes, spacers, etc.), because the space for loading uranium is reduced in case of the fuel cladding tubes and spacers having the conventional thickness due to an increase in the number of fuel rods arranged in the tetragonal lattice pattern and due to various shapes of water rods. When the thickness of zirconium alloy members such as fuel cladding tubes, spacers, etc. is reduced, particularly hydrogen embrittlement due to the reduction in the thickness is expected to take place. Hydrogen is generated by corrosion reaction with reactor core water and partly absorbed (picked up) into the members of the fuel assembly; but even if the amount of absorbed hydrogen is the same, the hydrogen content of the members will be higher with decreasing thickness. Since corrosion of members of a fuel assembly destined to a higher burnup level proceeds much more than those for the conventional burnup level, a higher corrosion resistance and a lower hydrogen pickup are required for the fuel cladding tubes and spacers for a higher burnup level.

Another object of the present invention is to provide a fuel assembly for a higher burnup level, optimized for corrosion resistance and for hydrogen pickup resistance of members of the fuel assembly, and optimized against curving deformation of a channel box due to irradiation growth.

In most general terms, the present invention provides a fuel assembly, and components thereof, and method of making and using such components and such fuel assembly. The components include (illustratively) fuel rods, each comprising a cladding tube and a nuclear fuel loaded therein, a spacer for providing the fuel rods at desired positions and integrating the fuel rods and water rods, tie plates, the water rods provided, e.g., at the center of the spacer, and a channel box. The cladding tubes, spacer, water rods and channel box, for example, are made of zirconium-based alloys used in nuclear reactors. The cladding tubes have a higher concentration of solid solution-state iron and nickel (or of iron, nickel and tin), which form components of the zirconium-based alloys, at the outer surfaces thereof than at the inner surfaces. The channel box has a crystallographic orientation parameter in the normal-to-plate direction of <0001> crystallographic orientation (Fr value) of 0.25 to 0.50. The channel box can also have a crystallographic orientation parameter in the longitudinal (rolling) direction (Fl value) of 0.25 to 0.36 and a crystallographic orientation parameter in the lateral direction (normal-to-the-rolling direction) (Ft value) of 0.25 to 0.36. The water rod has a crystallographic orientation parameter in the tube thickness direction of <0001> crystallographic orientation of 0.25-0.50, a crystallographic orientation parameter in the tube longitudinal (rolling) direction of 0.25-0.36, and a crystallographic orientation parameter in the tube circumferential direction of 0.25-0.36.

More specifically, the present invention provides a fuel assembly, which comprises a plurality of fuel rods, each comprising a cladding tube made from a zirconium-based alloy and a nuclear fuel pellets loaded therein, a spacer for providing the fuel rods at desired positions, an upper tie plate and a lower tie plate for supporting the thus provided fuel rods at their upper ends and the lower ends, a water rod provided at the center of the spacer, and a channel box made from a zirconium-based alloy for integrating the fuel rods and the water rod into one assembly and encasing the assembly of the fuel rods and the water rod; the cladding tubes, the spacer and the channel box each contain 1 to 2% by weight of tin, 0.20 to 0.35% by weight of iron, 0.03 to 0.16% by weight of nickel, the balance being substantially zirconium, the cladding tubes have a higher concentration of solid solution-state iron and nickel at the outer surfaces of the cladding tubes than at the inner surfaces, and the channel box has a crystallographic orientation parameter in the normal-to-plate direction of <0001> crystallographic orientation (Fr value) of 0.25 to 0.50.

The present invention further provides a fuel assembly, which comprises a plurality of fuel rods, each comprising a cladding tube made from a zirconium-based alloy and nuclear fuel pellets loaded therein, a spacer for providing the fuel rods at desired positions, an upper tie plate and a lower tie plate for supporting the thus provided fuel rods at their upper ends and the lower ends, a water rod provided at the center of the spacer, and a channel box made from a zirconium-based alloy for integrating the fuel rods and the water rod into one assembly and encasing the assembly of the fuel rods and the water rod; the cladding tubes are hardened and have a higher content of solid solution-state iron, chromium and nickel on the outer surfaces of the cladding tubes than that on the inner surfaces, and the channel box has a crystallographic orientation parameter in the normal-to-plate direction of <0001> crystallographic orientation (Fr value) of 0.25 to 0.50.

In the above-mentioned fuel assembly of the present invention, the channel box has a crystallographic orientation parameter in the normal-to-plate direction of <0001> crystallographic orientation (Fr value) of 0.25 to 0.50 and is fixed to the upper tie plate, and the water rod is fixed to the upper tie plate and the lower tie plate at its both ends, respectively, and has a crystallographic orientation parameter in the normal-to-plate direction of <0001> crystallographic orientation (Fr value) of 0.25 to 0.50.

In the above-mentioned fuel assembly, the cladding tubes are hardened and have a higher content of solid solution-state iron and nickel on the outer surfaces of the cladding tubes than that on the inner surfaces, and the channel box is thicker at the corners than on the surface sides and has a crystallographic orientation parameter in the normal-to-plate direction of <0001> crystallographic orientation (Fr value) of 0.25 to 0.50.

In the above-mentioned fuel assembly, the cladding tubes are hardened to a depth not more than a half of the thickness and have a higher content of solid solution-state iron, chromium and nickel on the outer surfaces of the cladding tubes than that on the inner surfaces, the channel box is thicker at the corners than on the surface sides and thicker at the lower level in the longitudinal direction than at the upper level and has a crystallographic orientation parameter in the normal-to-plate direction of <0001> crystallographic orientation (Fr value) of 0.25 to 0.50, and the cladding tubes, the spacer and the channel box each contain 1 to 2% by weight of tin, 0.20 to 0.35% by weight of iron, 0.03 to 0.16% by weight of nickel, the balance being substantially zirconium.

The water rod contains 1 to 2% by weight of tin, 0.05 to 0.20% by weight of iron, 0.05 to 0.15% by weight of chromium, and 0.03 to 0.1% by weight of nickel, the balance being substantially zirconium, or 1 to 2% by weight of tin, 0.18 to 0.24% by weight of iron and not more than 0.01% by weight of nickel, the balance being substantially zirconium.

The present channel box is made from a welded straight square cylinder having a substantially uniform thickness at the corners and on the surface sides and has a crystallographic orientation parameter in the normal-to-plate direction of <0001> crystallographic orientation (Fr value) of 0.25 to 0.50, and at least one of the cladding tubes, the spacer, the channel box and the water rod contains 1 to 2% by weight of tin, 0.05 to 0.02% by weight of iron, 0.05 to 0.15% by weight of chromium, and 0.03 to 0.1% by weight of nickel, the balance being substantially zirconium, or 1 to 2% by weight of tin, 0.18 to 0.24% by weight of iron and not more than 0.01% by weight of nickel, the balance being substantially zirconium.

The spacer is subjected to a hardening treatment by quenching from an ($\alpha+\beta$) phase region after a final plastic hot working.

The present invention provides a channel box for a fuel assembly, which is made from a zirconium-based alloy plate containing 1 to 2% by weight of tin, 0.20 to 0.35% by weight of iron and 0.03 to 0.16% by weight of nickel, the balance being substantially zirconium, a crystallographic orientation in the normal-to-plate direction of <0001> crystallographic orientation (Fr value) of 0.25 to 0.50, a crystallographic orientation parameter in the longitudinal (rolling) direction (Fl value) of 0.25 to 0.36 and a crystallographic orientation parameter in the lateral direction (normal-to-the rolling direction) (Ft value) of 0.25 to 0.36. Furthermore, 0.05 to 0.15% by weight of chromium can be contained in the alloy state.

The present invention provides a channel box for a fuel assembly, which is made from a zirconium-based alloy plate containing 1 to 2% by weight of tin, 0.05 to 0.20% by weight of iron, 0.05 to 0.15% by weight of chromium and 0.03 to 0.10% by weight of nickel, the balance being substantially zirconium, a crystallographic orientation in the normal-to-plate direction of <0001> crystallographic orientation (Fr value) of 0.25 to 0.50, a crystallographic orientation parameter in the longitudinal (rolling) direction (Fl value) of 0.25 to 0.36 and a crystallographic orientation parameter in the lateral direction (normal-to-the rolling direction) (Ft value) of 0.25 to 0.36.

Preferably, the zirconium-based alloy plate has an average grain size of 50 to 300 μm which is formed during the $\beta$-heat treatment, i.e. while said plate is heated to the $\beta$ phase temperature ($\beta$-phase Zn crystal grain size of 50 to 300 μm).

The present invention provides a spacer for a fuel assembly, which is made from a zirconium-based alloy containing 1 to 2% by weight of tin, 0.20 to 0.35% by weight of iron and 0.03 to 0.16% by weight of nickel, the balance being substantially zirconium, where fine grains of intermetallic compound of tin and nickel are precipitated in the $\alpha$-phase zirconium crystal grains. Furthermore, 0.05 to 0.15% by weight of chromium can be contained in the alloy state.

The present invention provides a water rod for a fuel assembly, which is made from a zirconium-based alloy tube containing 1 to 2% by weight of tin, 0.05 to 0.15% by weight of chromium and 0.03 to 0.10% by weight of nickel, the balance being substantially zirconium, a crystallographic orientation parameter in the tube thickness direction of <0001> crystallographic orientation (Fr value) of 0.25 to 0.50, a crystallographic orientation parameter in the tube longitudinal (rolling) direction (Fl value) of 0.25 to 0.36, and a crystallographic orientation parameter in the tube circumferential direction (Ft value) of 0.25 to 0.36. Furthermore, 0.05 to 0.15% by weight of Cr can be contained in the alloy state.

Preferably, the zirconium-based alloy has an average grain size of 50 to 300 μm which is formed during the $\beta$-heat treatment, i.e. while said plate is heated to the $\beta$ phase temperature ($\beta$-phase Zr crystal grain size of 50 to 300 μm).

The present channel box is prepared by bending the zirconium-based alloy plate into a channel-type member, welding the channel-type member to another channel-type member, thereby obtaining a long square cylindrical member, locally heating the long square cylindrical member in a $\beta$-phase temperature region and maintaining the member in the heated state for a short time while continuously moving the member, and forcedly cooling the heated part of the member with a cooling medium, thereby making the forcedly cooled part have a crystallographic orientation parameter in the normal-to-plate direction of <0001> crystallographic orientation of the zirconium-based alloy (Fr value) of 0.25 to 0.50.

The present cladding tubes are each prepared by continuously moving either a thick tube shell of the zirconium-based alloy after a final hot plastic working or a thin tube shell in the course between the final hot plastic working and a final cold plastic working in the longitudinal direction, locally heating the outer surface of the tube shell in an ($\alpha+\beta$) phase or $\beta$-phase temperature region and maintaining the outer surface in the heated state for a short time, while cooling the inner surface of the tube shell, and forcedly cooling the outer surface of the tube shell in the heated parts with a cooling medium.

The present spacer comprises spacer cells each prepared by continuously moving either a thick tube shell of the zirconium-based alloy after a final hot plastic working or a thin tube shell in the course between the final hot plastic working and an final cold plastic working in the longitudinal direction, locally heating the tube shell in an ($\alpha+\beta$) phase or $\beta$-phase temperature region and maintaining the tube shell in the heated state for a short time, and forcedly cooling the heated part of the tube shell with a cooling medium.

The present spacer can comprise the cells integrated with a frame member from a plate-shaped material being subjected to the same heat treatment as for the tube shell in place of the tube shells.

The present spacer comprises lattice cells integrated with a frame member made from a plate-shaped material being subjected to the same hardening as for the tube shell, in place of the tube shell.

The present water rod is prepared by continuously moving a long tube made from the zirconium-based alloy and subjected to a final cold plastic working in the longitudinal direction, locally heating the tube in a $\beta$-phase temperature region and maintaining the tube in the heated state for a short time, and forcedly cooling the heated part with a cooling medium, thereby making the tube have a crystallographic orientation parameter in the tube thickness direction of <0001> crystallographic orientation (Fr value) of 0.25 to 0.50, a crystallographic orientation parameter in the tube longitudinal (rolling) direction (Fl value) of 0.25 to 0.36, and a crystallographic orientation parameter in the tube circumferential direction (Ft value) of 0.25 to 0.36.

BRIEF DESCRIPTION OF THE DRAWINGS

FIG. 5 is a perspective view of other channel box;

FIG. 6 is a partial cutaway view of a fuel rod;

FIG. 7 is a partial cutaway view of a water rod;

FIG. 8 is a partial cutaway view of another water rod;

FIG. 11 is a perspective view of cells 31 in FIG. 10;

FIG. 12 is a diagram showing relations between strains due to irradiation growth and retention time for various Fr values;

Figure 1:
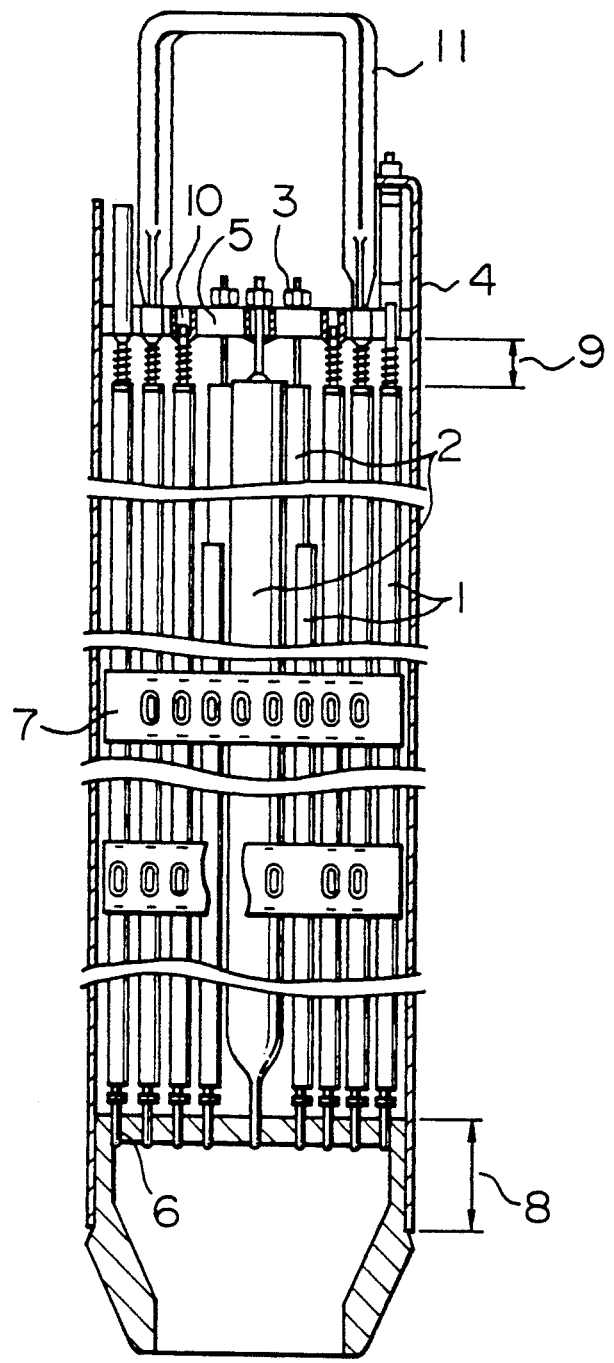
FIG. 1 is a cross-sectional view of a fuel assembly according to the present invention.

DETAILED DESCRIPTION OF THE INVENTION (1) Deformation of the zirconium alloy members used in a channel box depends on the <0001> crystallographic orientation of hexagonal crystal Zr in the direction substantially normal to the member surfaces. The hexagonal crystal lattice shrinks in the <0001> crystallographic orientation and expands in the direction normal to the <0001> crystallographic orientation, when irradiated with neutrons. More strictly speaking, a dislocated face (atomic face) is introduced in the <0001> crystallographic orientation due to the neutron irradiation, and shrinkage and expansion take place in the above-mentioned specific directions. As a result, elongation takes place in the longitudinal and lateral directions of the channel box, and shrinking deformation takes place in the normal-to-plate direction. Fuel rods elongate in the longitudinal direction. Neutron irradiation exposure is higher towards the center of the reactor core, and is lower towards the periphery of the reactor core. The channel box is provided at the periphery region of the reactor core, where the neutron irradiation dosage drastically changes, and thus there is a difference in the elongation between the surface side facing the reactor core center and the opposite surface side thereto of the channel box. Thus the channel box undergoes curving. The above-mentioned deformation caused by the neutron irradiation does not give rise to any volume change, and even if individual crystal grains of a polycrystalline material undergo deformation in specific directions, respectively, no deformation takes place on the whole, so long as the specific directions are in a random distribution. To suppress the irradiation growth and curving, it is effective to bring the crystallographic orientations into a random distribution.

In the present invention, the crystallographic orientations of the channel box and water rod are brought into a random distribution, whereas that of the fuel cladding tubes are not brought into a random distribution. Consequently, only the fuel rods elongate due to the irradiation growth, whereas neither the channel box nor the water rod undergoes elongation. Since the water rod fixed to the upper tie plate undergoes no change in length, the position of the upper tie plate undergoes no change, either. Since the upper end plugs of the fuel rods are not fixed to the upper tie plate, but only pass through the through-holes provided through the upper tie plate, no such force as to push the upper tie plate upwards is generated even if the fuel rods elongate, and the channel box fixed to the upper tie plate is never pushed upwards at all. As a result, the length of fitting allowance is never decreased. That is, the problem of fuel rod elongation can be solved by protruding the upper end plugs of the fuel rods from the upper tie plate through through-holes provided through the upper tie plate.

Generally, quantitative evaluation of the orientation parameter of a crystallographic orientation is carried out by measuring the reflectance on a specific crystal face and the refraction intensity of transmitted X-rays and calculating, an F value from the following equation (1):

$$F = \delta \sigma^{2/\pi} V(\phi) \cdot \cos^2\phi \cdot d\phi \qquad (1)$$

In the equation (1), $\phi$ means an angle of a specific crystallographic orientation (for example, <0001> crystallographic orientation) to a specific direction, for example, a normal-to-plate direction, and $V(\phi)$ is a volume ratio of crystal oriented in the $\phi$ direction. When crystallographic orientation parameters in the normal-to-plate direction (direction r), the longitudinal (rolling) direction (direction l), and the lateral direction (direction t), which are perpendicular to one another, are designated as Fr, Fl and Ft, respectively, sum total of Fr, Fl and Ft is equal to unity (1), and when the respective values are ⅓, the crystallographic orientations will be brought in a complete random distribution.

The <0001> crystallographic orientation of a plate or tube prepared by cold rolling is in a normal-to-plate (or tube) surface direction (direction r), its Fr value is in a range of 0.6 to 0.7, and its Fl value is in a range of 0.05 to 0.15. A channel box was subjected to irradiation by 3 cycles at the center region of a reactor core and by one cycle at the peripheral region of the reactor core and another channel box was also subjected to irradiation by 4 cycles at the center region of the reactor core to calculate influences of Fr value upon the curving degree of the channel boxes. One cycle consisted of an 18-month operation, and the neutron irradiation dosage was about $2 \times 10^{22}$ (n/cm$^2$) when the fuel assemblies were to be removed from the reactor, and these conditions were according to the most standard shuffling pattern. With increasing residence cycles in the peripheral region of the reactor core, the curving degree further increased. Clearance between the control rod and the channel box was about 3.3 mm wide at the initial period of fuel loading, and a deformation span due to expansion deformation was about 2.2 mm long besides that due to the curving deformation. That is, when the curving degree due to irradiation growth of a channel box having had an experience of residence in the peripheral region of the reactor core reached 1.1 mm, there occurred an interference between the channel box and the control rod. It was found that the Fr value of a channel box having had an experience of residence in the peripheral region of the reactor core must be brought into a more random distribution, that is, to at least 0.25, and the Fr value of a channel box having had no experience of residence in the peripheral region of the reactor core must be at least 0.20 to bring about a more random distribution.

It is effective for bringing the crystallographic orientations in a random distribution to heat the zirconium alloy material to a $\beta$-phase temperature range ($\geqq 980°$ C.) to make $\beta$-Zr crystal grains grow, and then cool the material. By the heat treatment, hexagonal $\alpha$-Zr crystal grains oriented in a specific direction are transformed to cubic $\beta$-Zr crystal grains, which are again transformed to hexagonal $\alpha$-Zr crystal grains by cooling. The crystallographic system of the Zr crystal grains after cooling to room temperature is the same hexagonal $\alpha$-phase as before the heating, but the crystallographic orientations of the materials having had an experience of transformation to the cubic $\beta$-phase are in a random distribution. The higher the heating temperature and the longer the heating time, the higher the degree of randomness. To obtain Fr value $\geqq 0.20$, a heat treatment parameter defined by the following equation must be 0.8 or more by controlling the heating temperature and the heating time:

$$P = (3.5 + \log t) \times \log(T-980)$$

t: heating time (h),
T: heating temperature (°C.)
Preferably, $P \geqq 1.5$. At $P=0.8$, $\beta$-Zr crystal grains have an average grain size of 50 $\mu$m, and at $P \geqq 1.5$ $\beta$-Zr crystal grains have an average grain size of 90 $\mu$m or more. An average grain size of not more than 300 $\mu$m at the maximum is preferable, and 70 to 130 $\mu$m is more preferable.

F values of the present channel box and water rod are preferably 0.25 to 0.36 for the Fl value, 0.25 to 0.36 for the Ft value and 0.25 to 0.50 for the Fr value. Particularly preferably, the Fr value is more than the Ft value and the Fl value, and it is most preferable that the Fl value is 0.30 to 0.35, the Ft value 0.30 to 0.35 and the Fr value 0.30 to 0.35. Ideally, all of the F values must be 0.3333. These F values depend on the heating temperature and times. Particularly a treating temperature is practically 980° to 1,350° C. and preferably 1,050° to 1,150° C. Preferable retention time at that temperature is as short as about one second to about one minute.

The present process for producing a channel box comprises heating a plate material locally in a $\beta$-phase temperature region by an induction coil for a desired residence or retention time while continuously moving the plate material, and forcedly cooling the plate material after the heating. By heating to the $\beta$-phase temperature region, the <0001> crystallographic orientation can be brought in a random distribution and a higher corrosion resistance to high temperature, high pressure pure water can be obtained. Cooling is preferably carried out by spraying water onto the heated plate material at a cooling rate of 100° C./sec or more, particularly 150° C./sec or more. Infrared heating and electric furnace heating can be also used as other heating means.

For the heating in the $\beta$-phase temperature region, the Zr-based alloy plate material must be fixed and constricted by members, such as a mandrel, having a higher coefficient of thermal expansion than that of the Zr-based alloy. Particularly in case of a tubular material, the heating and cooling are carried out preferably by inserting a metallic member as a mandrel into the tubular member without entire contact but with some local contact with the inside surface of the tubular member to decrease heat influence, and fixing both members at both ends to prevent deformation of the tubular member due to the heating and cooling. By providing such a constricting member, the heating and cooling can be readily carried out. Preferable constricting member materials include austenite stainless steels such as SUS 304, 316, 347, etc.

After the $\beta$-phase heat treatment, annealing is carried out at 500° to 650° C. to uniformly heat the entire member material.

It is also preferable to conduct the annealing while constricting the member material with the above-mentioned constricting member to rectify the shape of the tubular member. These heat treatments are carried out in a non-oxidative atmosphere, particularly preferably in Ar.

After the final heat treatment the oxide film is removed from the surface by sand blasting and pickling. After the removal of the oxide film, the surface is subjected to an oxidation treatment in an autoclave to form a stable oxide film on the surface, making a final product. The edge parts having screw holes, etc. for the fixing at both ends are removed from the final product.

Two open channel-formed (or U-shaped) members for the present channel box are butt welded to each other by plasma welding at the open channel edges to form a square cylinder, and then the welding seams are flattened. For the heat treatment of the square cylinder, a X-shaped contricting member is preferable. The present heat treatment can be carried out in the state of a plate material state, 2 channel-formed members or a welded square cylinder.

The above-mentioned temperature and time can be also applied to the production of a water rod, and the above-mentioned heat treatments can be carried out at any stage, that is, from the tube shell-shaped stage after the final hot plastic working to a tube-shaped stage after the final cold plastic working, as in the case of the present cladding tubes. However, when cold plastic working and annealing are carried out after the heat treatment, the random distribution of the crystallographic orientation turns anisotropic, and unless the corrosion resistance is most important, it is most preferable to conduct the heat treatment of the water rod together with the channel box after the final cold plastic working.

(2) In order to obtain a high corrosion resistance and a low hydrogen pickup ratio, it is important that the Zr-based alloy contains 1 to 2% by weight of Sn, 0.2 to 0.35% by weight of Fe and 0.03 to 0.16% by weight of Ni with or without Cr. Even if such a highly corrosion-resistant, high Fe—Ni, Zr-based alloy member is used in a BWR circumstance, no nodular corrosion appears and the hydrogen pickup ratio is considerably lower than that of currently available zircaloy materials.

The oxide film formed on the surface of zirconium alloy members has an n-type semiconductor characteristic of oxygen-deficient type ($ZrO_{2-x}$). The oxygen vacancy exists as an anion defect in the oxide film. The anion defect is kept electrically neutral by compensation with two electrons. When Fe ions, Ni ions and Cr ions undergo substitution at the sites of Zr ions in the oxide film, an oxygen vacancy is formed (cation vacancy), but the oxygen vacancy (cation vacancy) is not compensated with two electrons to form a cation defect. The two electrons compensating for the anion defect have a higher energy level and are liable to travel according to a potential gradient and thus determine the electron conductivity of the oxide film. On the other hand, the cation defect serves as a trap site for electrons and thus lowers the electron conductivity of the oxide film. Corrosion (oxidation) of zirconium alloy material in reactor core water depends on a balance between the charge transfer by oxygen ions in the film through oxygen vacancies toward the metal side and the charge transfer by electrons from the metal side toward the surface of the oxide film, and thus the corrosion rate is determined by the slower one of the above-mentioned two charge transfers in opposite directions to each other. In the BWR circumstance, the charge transfer by electrons from the metal side toward the surface of the oxide film is a predominant rate-determining factor. When the electron conductivity is lowered by the presence of Fe ions, Ni ions and Cr ions in the oxide film, the corrosion resistance will be increased. In order to substitute Zr ion-occupied positions with Fe ions, Ni ions and Cr ions in the oxide film, it is necessary that Fe, Ni and Cr exist in a solid solution state or exist in fine intermetallic compound phases in the Zr alloy, and larger amounts of these metal elements than those of the currently available zircaloy-2 material are uniformly distributed therein. Hydrogen pickup is due to reaction of Zr with water and absorption of a portion of hydrogen generated by the corrosion reaction into the alloy material. The higher the corrosion resistance, the smaller the amount of the generated hydrogen and the lower the hydrogen pickup ratio.

Nodular corrosion is a phenomenon that the above-mentioned corrosion reaction locally proceeds due to the local deficiency of substituent Fe ions, Ni ions and Cr ions at the Zr-occupied positions in the oxide film. In order to prevent such a deficiency, it is necessary to uniformly distribute these elements throughout the alloy. For uniform distribution of these alloy elements, it is effective to provide a heat treatment to heat the alloy material to a $\beta$-phase temperature region and/or $(\alpha+\beta)$ phase temperature region and successive quenching as a step in the process. By the heat treatment the intermetallic compound phases containing the alloy elements such as $Zr(Fe, Cr)_2$, $Zr(Fe, Ni)_2$, $Zr_2(Ni, Fe)$, etc. can be made to have an average grain size of 0.4 $\mu$m or less, and the Sn·Ni intermetallic compound phase can be made to have an average grain size of 0.2 $\mu$m or less, and they can be uniformly distributed throughout the alloy. It is effective to make a Fe/Ni ratio 1.4 to 15, preferably 10 or less and not to remove Cr from the alloy. Among the intermetallic compound phases, $Zr(Fe, Cr)_2$ grains (hexagonal crystalline system) are finest, followed by $Zr(Fe, Ni)_2$ grains (cubic crystalline system) and $Zr_2(Ni, Fe)$ grains (hexagonal crystalline system) are coarsest. By addition of Cr, the number of finest $Zr_2(Fe, Cr)_2$ grains (hexagonal crystalline system) is increased, and by increasing the Fe/Ni ratio, a ratio of finest $(Fe, Ni)_2$ grains to coarsest $Zr_2(Ni, Fe)$ grains is increased. Effect of making the intermetallic compound phases finer, and of a uniform distribution, on an increase in the corrosion resistance, will be explained below. When the zirconium alloy material is irradiated with neutrons in a nuclear reactor, the stability of intermetallic compound phases is lowered, and Fe, Ni and Cr are dissolved to form a solid solution in the matrix. As explained above, as a result of forming a solid solution of Fe, Ni and Cr, Fe, Ni and Cr undergo substitution at lattice positions of Zr in the oxide film to lower the electron conductivity. By making the intermetallic compound phases finer, their surface area is increased to promote their dissolution and increase the concentration of Fe, Ni and Cr solid solution. By uniform distribution, the concentration of the solid solution is made uniform to elevate the uniformity of electron conductivity of the oxide film and prevent the nodular corrosion. On these grounds the corrosion resistance (nodular corrosion resistance) and hydrogen pickup resistance of zirconium alloy material can be increased. As a result, it is possible to make the zirconium alloy member thinner.

Below 1% by weight of Sn neither sufficient corrosion resistance nor sufficient strength can be obtained, whereas above 2% by weight of Sn, no more remarkable effect can be obtained, but the workability is lowered. Thus, 1 to 2% by weight, particularly 1.2 to 1.7% by weight, of Sn is preferable.

At least 0.20% by weight of Fe is required for increasing the hydrogen pickup resistance. Above 0.35% by weight of Fe, no more remarkable effect can be obtained, but the workability is lowered. Thus, not more than 0.35% by weight, particularly 0.22 to 0.30% by weight of Fe is preferable.

A very small amount of Ni, i.e. at least 0.03% by weight of Ni, is contained in order to remarkably increase the corrosion resistance, but Ni promotes hydrogen pickup, resulting in an increase in the embrittlement. Thus, not more than 0.16%, particularly 0.05 to 0.10%, by weight of Ni is preferable.

The present Zr-based alloy can contain 0.05 to 0.15% by weight of Cr. At least 0.05% by weight of Cr is required for increasing the corrosion resistance and strength, whereas, above 0.15% by weight of Cr, the workability is lowered. Thus, 0.05 to 0.15% by weight of Cr is preferable.

The present Zr-based alloy can be used for cladding tubes, spacers, channel boxes, and water rods. With the present Zr-based alloy, the former three members can have an average burnup level of 50 to 550 GWd/t. Even in that case, zircaloy-2 alloy can be used for the water rods.

The Zr-based alloy for use in the present fuel assembly further includes zircaloy-2 (Ti: 1.2–1.7 wt. %; Fe: 0.07–0.20 wt. %; Cr: 0.05–0.15 wt. %, Ni: 0.03–0.08 wt. %, the balance: substantially Zr), and zircaloy-4 (Ti: 1.2–1.7 wt. %; Fe: 0.18–0.24 wt. %; Ni: <0.07 wt. %); the balance: substantially Zr), and these alloys can be used in combination of the afore-mentioned alloy in view of the average discharge burnup level.

Cladding tubes for use in the present invention are preferably those prepared by quenching from $(\alpha+\beta)$ phase region or $\beta$-phase temperature region after the final hot plastic working and successive repetitions of cold plastic working and annealing. Particularly, quenching from the $(\alpha+\beta)$ phase temperature region is preferable, because the successive cold plastic working is better than that quenched from the β-phase temperature region.

Preferable Zr-based alloys are those quenched from β-phase or (α+β) phase temperature region, and the quenching treatment is preferably carried out after the final hot plastic working, but before the final cold plastic working, and particularly preferably before the initial cold plastic working.

Preferable (α+β) phase temperature region is in a range of 800° to 950° C., and preferable β-phase temperature region is in a range of 950° to 1,100° C. Quenching is carried out from these temperature regions with flowing water, sprayed water, etc. Particularly preferably, quenching is carried out before the initial cold plastic working, where it is preferable to conduct local heating by high frequency heating to the outer periphery while passing water into the tube shell.

As a result, the inner surface of the tube is not hardened and the ductility is increased, whereas the outer surface of the tube is hardened and the corrosion resistance is increased and the hydrogen pickup ratio is lowered. Since heating in the (α+β) phase temperature region produces different proportions of the α-phase to the β-phase, depending on a temperature, it is preferable to select a temperature at which the β-phase is mainly formed. The α-phase is not converted by the quenching, contributing to a lower hardness and a higher ductility, and quenching from the region converted to the β-phase forms a needle-like phase of high hardness with a low cold workability. However, existence of even a small proportion of the α-phase can give a high cold plastic workability, and low corrosion resistance and hydrogen pickup ratio. It is preferable to conduct heating at a temperature, where the β-phase has an area ratio of 80 to 95%, and quenching from that temperature. Heating is carried out for a short time, for example, for not more than 5 minutes, particularly 5 seconds to one minute. Prolonged heating is not preferable because it allows crystal grains to grow, forming precipitates and lowering the corrosion resistance.

Annealing temperature after the cold plastic working is preferably 500° to 700° C., particularly preferably 550° to 640° C. Below 640° C., a higher corrosion resistance can be obtained. It is preferable to conduct the heating in an Ar atmosphere or in high vacuum. The vacuum degree is preferably $10^{-4}$ to $10^{-5}$ Torr, and it is preferable that no substantial oxide film is formed on the alloy surface by annealing and the alloy surface shows an uncolored metallic luster. The annealing time is preferably 1 to 5 hours.

It is preferable to conduct welding by TIG, laser beam or electron beam, and particularly by TIG. It is also preferable that the end plugs and the cladding tubes are preferably made from a Zr-based alloy material of the same composition, and a He gas is used for sealing at a high pressure depending on a desired burnup level, for example, 3 to 20 atmospheric pressures.

(3) Combination of Zr-based alloy materials with treatments for respective burnup levels:

(a) Burnup level of 50 to 55 GWd/t:

The above-mentioned highly corrosion-resistant, highly Fe—Ni, zirconium-based alloy is used for cladding tubes, spacers, and a channel box, where the cladding tubes and spacers are hardened in the above-mentioned (α+β) phase temperature region or β-phase temperature region, and the channel box is subjected to a heat treatment in the β-phase temperature region to bring the crystallographic orientations into a random distribution. Zircaloy-2 is used for the water rods and is subjected to a heat treatment in the β-phase temperature region to bring the crystallographic orientations into a random distribution. The water rods have an axial distribution of larger wall thickness and a large thickness at the corners. The water rods are connected and fixed to upper and lower tie plates.

(b) Burnup level of 45 GWd/t:

Zircaloy-2, zirconium-based alloy is used for cladding tubes, a channel box and water rods, where the cladding tubes are subjected to the above-mentioned (α+β) or β-phase heat treatment, and the channel box and the water rods are subjected to a heat treatment in the β-phase temperature region to bring the crystallographic orientations in a random distribution. Highly corrosion-resistant, highly Fe—Ni, zirconium-based alloy is used for spacers and is subjected to (α+β) or β-phase hardening. The channel box having a large wall thickness at the corners is used.

(c) Burnup level of 38 GWd/t:

Zircaloy-2 alloy is used for cladding tubes, spacers, a channel box and water rods, where the cladding tubes and the spacers are hardened in the (α+β) or β-phase temperature region, and the channel box is heat treated in the β-phase temperature region to bring the crystallographic orientations into a random distribution. A straight channel box is used. It is preferable to heat-treat the water rods in the β-phase temperature region to bring the crystallographic orientations in a random distribution.

(d) Burnup level of 32 GWd/t:

Zircaloy-2 is used for cladding tubes, and zircaloy-4 is used for other members. Zircaloy-2 can be used for a channel box and spacers. The cladding tubes and the spacers are hardened in the (α+β) phase temperature region or the β-phase temperature region, and the channel box is heat-treated in the β-phase temperature region to bring the crystallographic orientations into a random distribution and is a straight one with a uniform wall thickness. The water rods can be likewise heat treated in the β-phase temperature region to bring the crystallographic orientations into a random distribution and the water rods subjected to such a treatment are preferably used. Spacers of a lattice type can be used, where plate-shaped materials are welded into the lattice form. Thus, the hardening is carried out in view of the plate-shaped materials and at least one run of each of cold plastic working and annealing must be carried out after the hardening.

In the following, the present invention will be described in terms of examples. These examples are illustrative, and not limiting, of the present invention.

PREFERRED EMBODIMENTS OF THE INVENTION

Example 1

(1) FIG. 1 is a cross-sectional view of a fuel assembly for a boiling water nuclear reactor according to the present invention.

A BWR fuel assembly comprises a large number of fuel rods 1, spacers 7 provided at a plurality of stages for supporting the fuel rods 1, each fuel rod loaded with fuel pellets in a cladding tube, at desired distances from one another, a channel box 4 of square cylinder for encasing the fuel rods and the spacers, an upper tie plate 5 and a lower tie plate 6 for supporting the fuel rods 1 at both ends, respectively, water rods 2 provided at the center region of the spacers, and a handle 11 for carrying the entire assembly, as shown in FIG. 1. The fuel assembly can be fabricated through the ordinary steps.

The fuel channel box 4 encases the fuel rods 1 and the water rods 2 assembled by the fuel spacers 7, and the upper tie plate 5 and the lower tie plate 6 are fixed by the water rods 2. The fuel channel box 4 is in a shape of a square cylinder, prepared by joining two open channel-shaped (U-shaped) plate members by plasma welding. The channel box rectifies a stream of steam generated on the surfaces of fuel rods and a stream of high temperature water passing through the clearances among the fuel rods and acts to guide the streams upwards forcedly during the reactor operation. Since the inner pressure is slightly higher than the external pressure, the channel box in use is under a stress expanding the square cylinder outwards for a long time.

In the present fuel assembly three water rods 2 are provided symmetrically to one another in the center region of the spacers 7 and are each fixed to the tie plates by screw means 3 at both ends. The channel box 4 is fixed to the upper tie plate 5 by screw means and the entire fuel assembly can be carried by the handle 11.

In this Example, the fuel rods are not fixed to the tie plates.

(2) The channel box is heat-treated so that the crystallographic orientation parameter in the normal-to plate direction of <0002> crystallographic orientation (Fr value) can be 0.25 to 0.5, the crystallographic orientation parameter in the longitudinal direction (Fl value) 0.25 to 0.36 and the crystallographic orientation parameter in the width direction (Ft value) 0.25 to 0.36. By making such an orientation by the heat treatment, β-Zr crystal grain size will be 50 to 300 μm on average and the irradiation elongation can be remarkably prevented, whereby an interference between the channel box and the control rods can be prevented.

Figure 2:
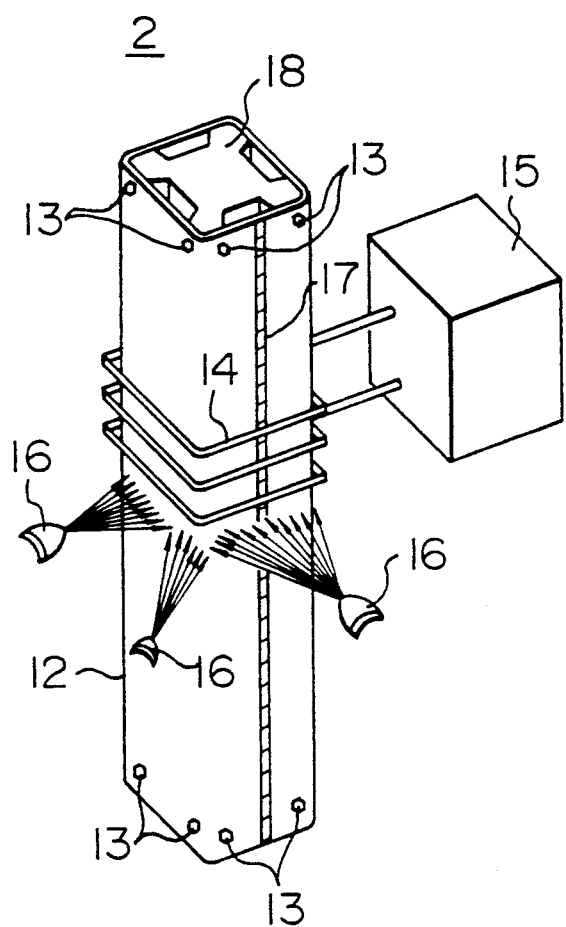
FIG. 2 is a structural view of an apparatus for heat treating a channel box.

FIG. 2 is a perspective view showing one embodiment of fabricating a channel box according to the present invention.

Two zircaloy-C plates having an alloy composition shown in Table 1 were cold bent to open channel-shaped plates to obtain two open channel-shaped members having a length of 4 m, and the open channel-shaped member were butt-welded to each other along the channel edges by laser or plasma welding to form a square cylinder 12. Projections on the welding seams 17 were made flat by finishing. Then, the square cylinder 12 was heated to a β-phase temperature region by high frequency induction heating and successively quenched with cooling water injected from nozzles 16 provided below a high frequency induction heating coil 14. The square cylinder 12 was passed through the coil 14 at a constant speed from the upside downwards, whereby the entire heat treatment was completed. Feeding speed of the square cylinder 12 and the power output of a high frequency power source 15 were so adjusted that the heating temperature could be 1,100° C. and the retention time at 980° C. or higher could be at least 10 seconds. After the heat treatment, test pieces, 40 mm wide and 40 mm long, were cut out from the square cylinder to measure F values. Table 2 shows the results of the measurement.

Heat treatment parameter (P) was 1.96 and the heat treatment was carried out by fixing an austenite stainless steel mandrel 18 to the square cylinder 12 at both ends by screw means 13. As is apparent from Table 2, the <0002> bottom face and <1010> column face of the hexagonal column had Fr, Fl, and Ft values each of substantially ⅓ as F values and were in a completely random crystallographic orientation. The square cylinder had a β-Zr crystal grain size of about 100 μm on the average. After the heat treatment, the square cylinder was reshaped with a high dimensional precision and subjected to sand blasting and pickling to remove the surface oxide film, and then subjected to an autoclave treatment with steam.

TABLE 1

| Alloy species | Alloy element | | | | | |
|---|---|---|---|---|---|---|
| | Sn | Fe | Cr | Ni | O | Zr |
| Zircaloy-4 | 1.50 | 0.21 | 0.10 | — | 0.12 | bal. |
| Zircaloy-2 | 1.50 | 0.15 | 0.10 | 0.10 | 0.12 | bal. |
| Zircaloy-C | 1.50 | 0.25 | 0.10 | 0.10 | 0.12 | bal. |

TABLE 2

| Heat treatment | (0002) face | | | (1010) face | | |
|---|---|---|---|---|---|---|
| | Fr | Fl | Ft | Fr | Fl | Ft |
| 1100° C./10s | 0.333 | 0.333 | 0.334 | 0.333 | 0.334 | 0.333 |

Figure 3A:
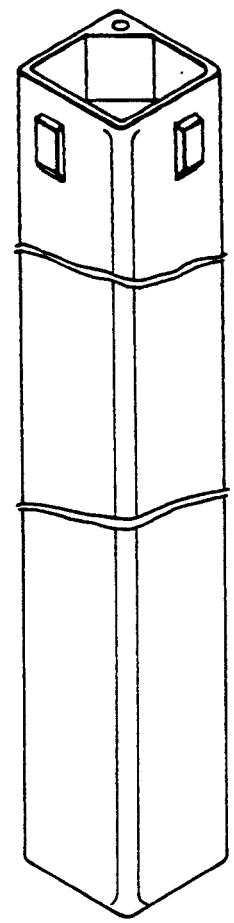
FIGS. 3A and 3B are a perspective view and a cross-sectional view of a channel box, respectively.
Figure 3B:
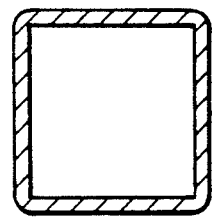
Figure 4A:
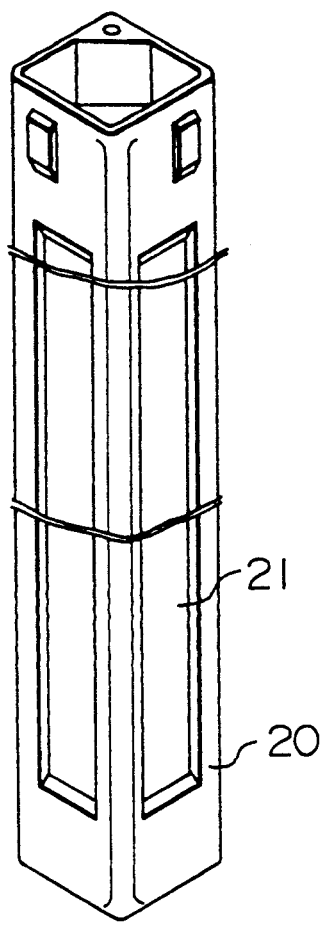
FIGS. 4A, 4B and 4C are a perspective view and cross-sectional views of another channel box, respectively.
Figure 4B:
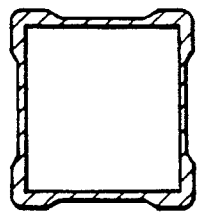
Figure 4C:
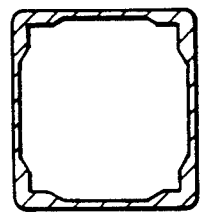

FIGS. 3A, 4A and 5 are perspective views showing channel boxes having different cross-sectional profiles in the longitudinal direction, respectively, and FIGS. 3B and 4B are cross-sectional views of FIGS. 3A and 4A each at an intermediate level. FIG. 4C shows a modification of the profile shown in FIG. 4B.

The side surfaces and corner edges of the channel box shown in FIG. 3A have a uniform wall thickness distribution throughout the longitudinal direction, as shown in FIG. 3B, whereas the side surfaces of the channel box shown in FIG. 4A have recesses 21 having a smaller wall thickness on the outer surfaces than that of the corner edges 20, as shown in FIG. 4B. The recesses can be formed on the inner surface sides of the channel box as shown in FIG. 4C.

The side surfaces of the channel box shown in FIG. 5 have a staged wall thickness distribution in the longitudinal direction, that is, there are recesses of different wall thicknesses on the outer surface sides, i.e. smaller wall thickness at the upper part 22 than at the lower part 23 as shown in FIG. 5. Furthermore, the corner edges 20 of the channel box as shown in FIG. 5 have a largest wall thickness among the wall thicknesses of the side surfaces. The recesses on the side surfaces can be formed by chemical etching using an aqueous acid solution of hydrogen fluoride and nitric acid or by mechanical working. In this Example, the outer side surface were mechanically worked to form recesses thereon.

(3) FIG. 6 is a partially cutaway view of a fuel rod according to the present invention. The present fuel rod comprises a cladding tube 24, fuel pellets 25 loaded in the cladding tube 24, and end plugs 27 and a prenum spring 26, and a helium (He) gas being filled inside. In this Example, He is sealed therein at 15-25 atmospheric pressures. The cladding tube 24 is fabricated in the following manner:

A pure Zr liner is provided on the inside surface of the cladding tube 24. The liner is provided onto the inner surface of a tube shell after the heat treatment and then subjected to cold plastic working and annealing.

As the tube shells, tube shells having an outer diameter of 63.5 mm and a thickness of 10.9 mm, made from the alloys shown in Table 3 by hot rolling were used. Each tube shell was passed through a high frequency induction heating coil and heated, while passing water into the tube shell from the bottom side upwards, and then quenched by injecting water onto the outer surface of the tube shell from nozzles provided just below the coil. The maximum heating temperature was 930° C., which falls in the $(\alpha+\beta)$ phase temperature region, and an average cooling speed was about 150° C./s from 930° C. to 500° C. The high frequency-hardened tube shells were subjected to three runs of cold rolling by a Pilger mill and successive annealing at 600° C. in vacuum, where the final annealing temperature was 577° C. Then, the tube shells were used as materials for the fuel cladding tubes and round cells for spacers. In case of the round cells for spacers the tube shells were heated without passing water into the tube shells. Differences in the shapes between the fuel cladding tube and the round cells for spacers are in the tube diameter and the wall thickness, and thus two kinds of tubes having different tube diameters and wall thicknesses were prepared by changing the rolling degree in the final cold rolling. The outer diameter of the round cells for spacers was larger than that of the cladding tube and the wall thickness of the former was smaller than that of the latter. Percent cross-sectional area reduction in the cold rolling was set to 70-80% per run of rolling. The thickness of the liner was about 10-100 μm. The inner surface of the thus obtained cladding tubes had a specific crystallographic orientation, i.e., a Fr value of 0.6 to 0.7.

Slip-shaped test pieces were cut out from the thus prepared two kinds of tube shells, and exposed to a higher temperature and pressure steam (500° C.; 10.3 MPa) for 24 hours to investigate weight increases due to corrosion and appearance of corroded test pieces. The results are shown in Table 4.

TABLE 3

| Alloy species | Alloy element | | | | | | |
|---|---|---|---|---|---|---|---|
| | Sn | Fe | Cr | Ni | O | Zr | Fe/Ni ratio |
| Zircaloy-2 | 1.50 | 0.15 | 0.10 | 0.05 | 0.11 | bal. | 3.0 |
| Zircaloy-A | 1.50 | 0.23 | 0.10 | 0.05 | 0.11 | bal. | 4.6 |
| Zircaloy-B | 1.50 | 0.23 | 0.10 | 0.09 | 0.11 | bal. | 2.6 |
| Zircaloy-C | 1.50 | 0.13 | 0.10 | 0.09 | 0.11 | bal. | 1.4 |
| Zircaloy-D | 1.50 | 1.10 | — | 0.08 | 0.11 | bal. | 1.3 |

TABLE 4

| Alloy species | Appearance | Increase in corrosion (mg/dm$^2$) |
|---|---|---|
| Zircaloy-2 | Partial nodular corrosion | ~150 |
| Zircaloy-A | Uniform black | 60~80 |
| Zircaloy-B | Uniform black | 60~80 |
| Zircaloy-C | Uniform black | 60~80 |
| Zircaloy-D | Full nodular corrosion | ~250 |

In case of so far used zircaloy-2 and zircaloy-D, Table 3 shows occurrence of nodular corrosion and a high increase in corrosion. In case pf alloys (zircaloy-A to zircaloy-C) having a higher Fe/Ni ratio than 1.4, and higher Fe and Ni contents than those set in the Standard Code range for zircaloy-2, no nodular corrosion appeared, but black oxide films of uniform thickness were formed, showing a very high corrosion resistance. It can be seen from the foregoing results that alloys having a higher Fe/N ratio than 1.4, containing Cr and having higher Fe and Ni contents than those set in the Standard Code range for zircaloy-2, have a higher corrosion resistance, even if used in a nuclear reactor. Corrosion degree of the alloys after the 6 years' service can be estimated to 130 mg/dm$^2$ (oxide film thickness: 8 μm) and the spacer can be estimated to have a hydrogen content of less than about 250 ppm.

It is preferable for the zirconium-based alloy for the cladding tubes and spacers to precipitate grains of tin-nickel intermetallic compound having grain sizes of not more than 0.2 μm and grains of iron-nickel-zirconium intermetallic compounds having grain sizes of 0.1 to 0.5 μm in the α-phase zirconium crystal grains. In this Example, the grain sizes of the former were as fine as about 0.01 μm.

(4) FIGS. 7 and 8 are partially cutaway views of water rods, and in this Example a water rod having a larger diameter as shown in FIG. 8 is used and zircaloy-2 shown in Table 1 is used as the alloy for the tube shell. As explained above, a tube shell is hardened in the $(\alpha+\beta)$ phase temperature region or the $\beta$-phase temperature region, and then subjected to cold plastic working to a desired shape and successive annealing, whereby a water rod can have smaller diameter parts 28, a larger diameter part 29 and end plug parts 30. Screw means are provided at the end plug parts 30 to fix the end plug parts to the upper and lower tie plates, respectively, as already explained.

Figure 9:
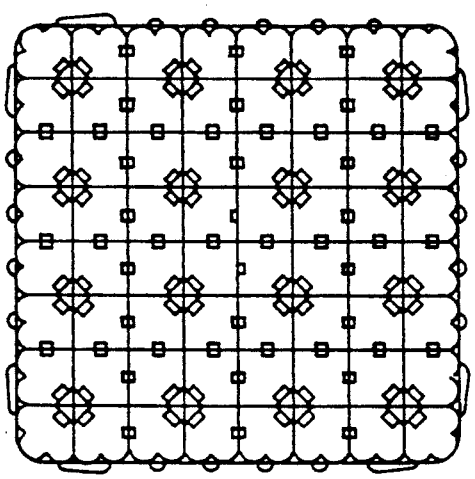
FIG. 9 is a plan view of a spacer.
Figure 10:
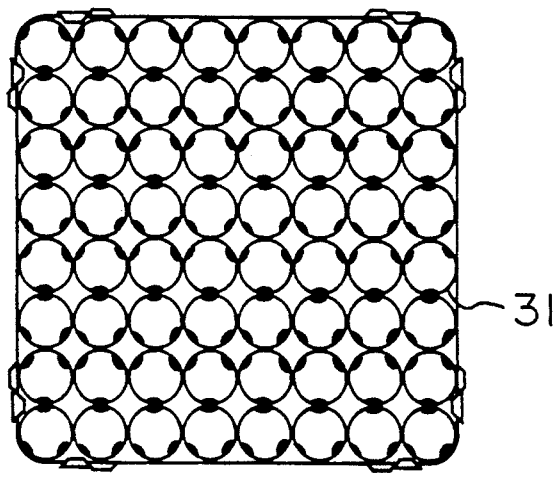
FIG. 10 is a plan view of another spacer.

(5) FIGS. 9 and 10 show plan views of spacers, respectively, and in this Example, round cell-type spacer shown in FIG. 10 is used and zircaloy-B shown in Table 3 is used for the round cell spacer material. FIG. 11 is a perspective view of round cells for spacers, which are prepared by hardening heat treatment of tube shells from the $(\alpha+\beta)$ phase temperature region, followed by repetitions of cold plastic working and annealing to obtain tube shells of desired smaller wall thickness, and cutting the thus obtained tube shell, thereby obtaining round cells in the desired shape.

(6) Fuel pellets having a uranium-235 enrichment of about 4.5 wt. % are loaded into the above-mentioned fuel rods to obtain a discharge burnup level of 50 to 550 GWd/t. The service duration of the fuel is 6 to 6.5 years. The end plugs are butt-welded to ends of each cladding tube by laser welding.

For the tie plates, an austenite steel casting containing not more than 0.03% by weight of C, not more than 2% by weight of Si, not more than 2% by weight of Mn, 8 to 12% by weight of Ni, and 17 to 21% by weight of Cr, the balance being Fe, is used. The casting is subjected to a solubilization treatment at 1,100° C.

The above-mentioned channel boxes were subjected to a fast neutron irradiation test and it was found that a strain occurrence was as very small as $0.3 \times 10^{-4}$ at $3 \times 10^{22}$ n/cm$^2$.

Test Example 1

The alloys shown in Table 1 were subjected to heat treatments shown in Table 5 to investigate relations between the degree of randomness of crystallographic orientation and elongation by neutron irradiation of Zr-based alloys for use in the above-mentioned channel box. The degree of randomness of the crystallographic orientation was changed by changing the heat treatment conditions.

TABLE 5

| Heat treatment No. | Max. heating temp. (°C.) | Retention time (sec.) | Cooling speed (°C./sec.) | P |
|---|---|---|---|---|
| 1 | No heat treatment | | | |
| 2 | 900 $(\alpha + \beta)$ | 600 | 200 | — |

TABLE 5-continued

| Heat treatment No. | Max. heating temp. (°C.) | Retention time (sec.) | Cooling speed (°C./sec.) | P |
|---|---|---|---|---|
| 3 | 1000 (β) | 60 | 200 | 2.24 |
| 4 | 1000 (β) | 600 | 200 | 3.54 |
| 5 | 1000 (β) | 60 | 150 | 4.03 |
| 6 | 1000 (β) | 5 | 200 | 0.84 |

All of these alloys were in a plate shape having a thickness of 2 mm, and cold rolling and annealing at 650° C. for 2 hours were repeatedly carried out for the alloys before the heat treatment. Heat treatment Nos. 2 to 5 shown in Table 5 were carried out by cutting out test pieces, 40 mm wide and 40 mm long, from the test plates, heating the test pieces in an electric furnace, followed by cooling in water. Heat treatment No. 6 was carried out by retaining a test piece cut out from the test plate in an infrared heating furnace, followed by cooling in water. Parameter P was calculated according to the above-mentioned equation.

Table 6 shows a result of measuring F values of (0002) bottom face [the face in parallel with the (0001) face] and (1010) column face [the face normal to the (0001) face] of hexagonal columns of test pieces subjected to heat treatment Nos. 1 to 6. Fr values show an orientation probability in the normal-to-plate direction, Fl values that in the plate-rolling direction, and Ft value that in the direction perpendicular to the former two. No difference was observed in the F values due to changes in the alloy compositions. It can be seen from Table 6 that the test piece (Heat treatment No. 1) prepared by repetitions of ordinary cold rolling and annealing had a high Fr value such as about 0.7 on the (0002) face and a low Fr value such as about 0.15 on the (1010) column face, and thus the (0002) face was oriented substantially in parallel with the plate surface. The test piece (Heat treatment No. 2) subjected to heating to the (α+β) phase temperature region of 900° C., followed by cooling in water, had F values substantially equal to those of the test piece without heat treatment (Heat treatment No. 1), and it can be seen therefrom that the crystallographic orientation was not substantially changed by the heating to the (α+β) temperature region, followed by cooling. Test piece (Heat treatment No. 6) subjected to heating up to 1,000° C. and retention in the β-phase temperature region (>980° C.) for 5 seconds had a decrease in the Fr value and an increase in the Fl value and the Ft value on the (0002) face, but an increase in the Fr value and a decrease in the Fl value and the Ft value on the (1010) column face. It can be seen therefrom that the crystallographic orientation was brought into a random distribution and the Fl value was made higher than 0.20 by making the P value higher than 0.8, but failed to satisfy the target value for preventing an interference between the channel box and the control rods when placed in the core periphery region, that is, Fl value on the (0002) face ≥0.25. Test pieces of Heat treatment Nos. 3 to 5 all satisfied a Fl value ≥0.25 and it can be seen therefrom that the channel box and the control rods will not interfere with one another when placed in the core peripheral region.

TABLE 6

| Heat treatment No. | (0002) face | | | (1010) face | | |
|---|---|---|---|---|---|---|
| | Fr | Fl | Ft | Fr | Fl | Ft |
| 1 | 0.672 | 0.108 | 0.220 | 0.158 | 0.448 | 0.393 |
| 2 | 0.666 | 0.124 | 0.210 | 0.156 | 0.445 | 0.398 |
| 3 | 0.414 | 0.295 | 0.292 | 0.301 | 0.354 | 0.345 |
| 4 | 0.335 | 0.352 | 0.318 | 0.325 | 0.329 | 0.344 |
| 5 | 0.336 | 0.334 | 0.330 | 0.330 | 0.335 | 0.335 |
| 6 | 0.470 | 0.203 | 0.327 | 0.209 | 0.401 | 0.390 |

Strain developed due to neutron irradiation growth was investigated by changing Fr values in the above-mentioned heat treatment.

FIG. 12 is a diagram showing relations between the fast neutron irradiation dosage and strain developed due to the irradiation growth, where calculation results of influence of Fr value on the curving degree of channel boxes when exposed to one cycle of irradiation in the core periphery region and 4 cycles of irradiation in the core center region are summarized. As shown in FIG. 12, when the Fr value exceeds 0.4, strain rapidly increases with increasing neutron irradiation dosage, but below 0.4, the strain is saturated with no more increase even if irradiated. Particularly at Fr=0.35, the <0001> crystallographic orientation is substantially in a random distribution, and thus the strains in the normal-to-plate direction, the longitudinal direction and the width direction are off-set among the individual crystals and thus the strain developed is less than $0.5 \times 10^{-4}$, that is, no strain develops at all. At Fr=0.4, the strain developed is small up to an irradiation dosage of $3 \times 10^{22}$ n/cm$^2$, with gradual increase with a higher neutron irradiation dosage. At Fr=0.35, the strain never increases with increasing neutron irradiation dosage.

Relations between Fr values and strains due to irradiation growth by irradiation of fast neutrons at a dosage of $3 \times 10^{22}$ n/cm$^2$ were investigated and it was found that the strain was rapidly increased with increasing Fr values, and particularly a strain due to the irradiation growth at Fr=0.35 was about $0.2 \times 10^{-4}$, which was considerably smaller by about 1/7 than about $1.5 \times 10^{-4}$ at Fr=0.4, which was considerably lower by about ⅓ than that at Fr=0.5. The strain at Fr=0.5 was about one-half of that at Fr=0.6, which was about one-half of that at Fr=0.7. No remarkable effect was obtained above Fr=0.4.

Round crystal grains observed in the metallic structures of the heat-treated test pieces Nos. 1, 3 and 4 contained no α-Zr crystal grains. Observed polygonal crystal grains were β-Zr crystal grains formed by heating to and retaining in the β-phase temperature region, and with increasing retention time at 1,000° C. from one minute to 10 minutes the β-Zr crystal grains grew to larger grain sizes. Laminar or needle-like structures observed in the β-Zr crystal grains were formed when the β-Zr crystal grains was transformed again to the α-Zr crystal grains in the cooling step without corresponding to the β-Zr crystal grain boundaries.

Relations between the β-Zr crystal grain sizes and the Fr values on the (0002) face reveal that when the β-Zr crystal grain size exceeds 200 μm, an aggregated structure having a Fr value of not more than 0.35 will be formed.

By making the crystal grains grow in this manner, the crystallographic orientation of (0002) face can be brought in a random distribution, and the degree of randomness of that orientation is about 75% at a Fr value of 0.40 and a Fl value of 0.30, where the grain size will be about 100 μm. With crystal grain size of 150 μm or more, a degree of randomness will be about 80% or more, and the Fr value will be 0.385 at a Fl value of 0.320, and at a Fr value of 0.35 and a Fl value of 0.34, the degree of randomness will be about 90% or more, where the crystal grain size will be about 250 μm or more.

Relations between the β-Zr crystal grain sizes and the strain due to the irradiation growth reveal that with grain sizes of 20 μm or more, the strain will be $4 \times 10^{-4}$ or less, and with grain sizes of 90 μm or more, the strain will be considerably as small as about $1.5 \times 10^{-4}$. With grain sizes of 150 μm or more, the strain will be very small, for example, $0.5 \times 10^{-4}$ or less. Particularly with grain sizes of 200 μm or more, the strain will be about $0.3 \times 10^{-4}$.

Figure 13:
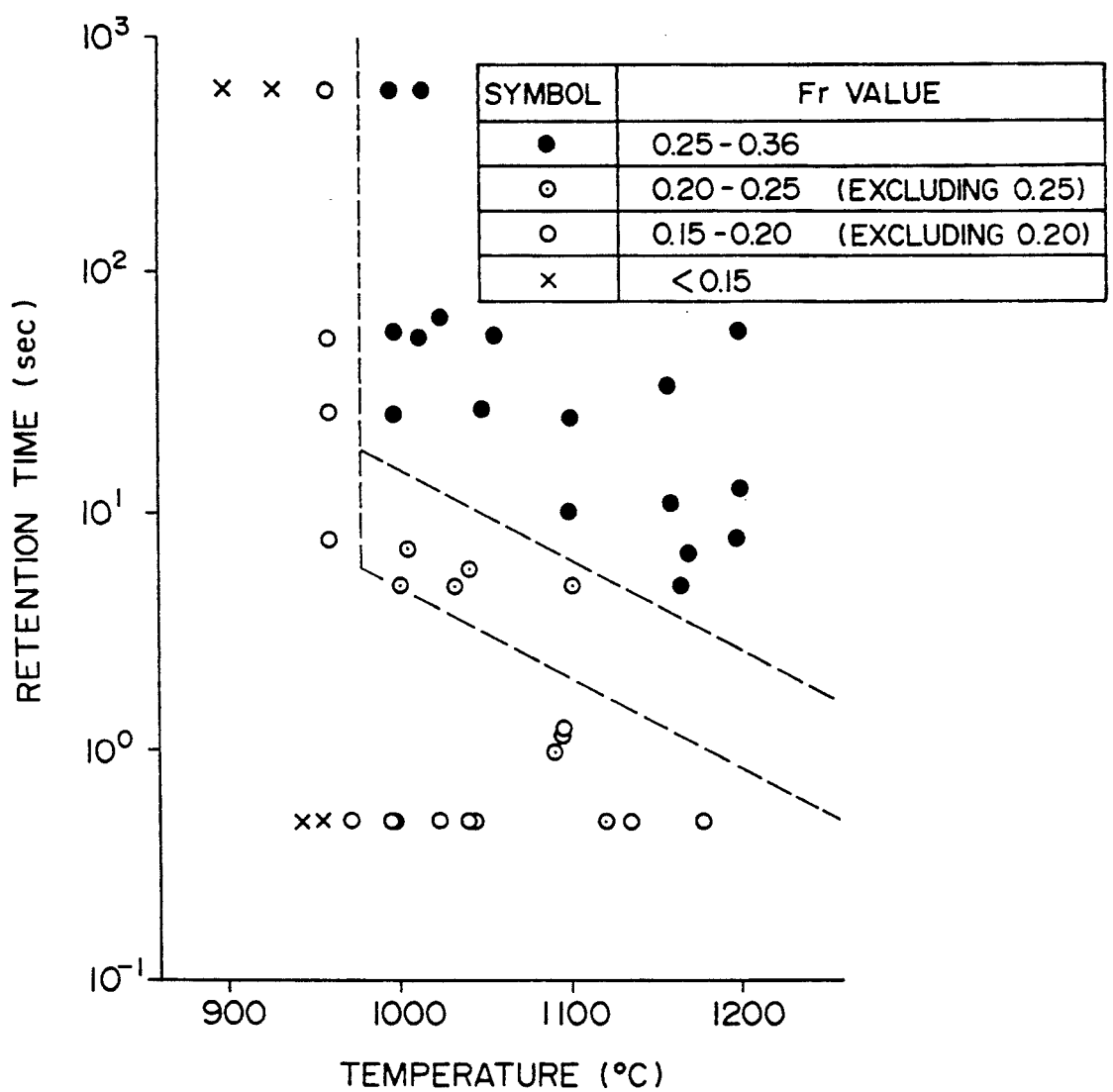
FIG. 13 is a diagram showing relations between heating temperature and retention time for various Fr values.

FIG. 13 is a diagram showing relationships for Fr values of alloys shown in Tables 1 and 3, between a temperature and a retention time. As shown in FIG. 13, below 980° C., the Fr value will be not more than 0.20, and the <0002> crystallographic orientation will be hardly brought into a random distribution.

By heating in a region formed between a straightly elevating line at 980° C. for at least 11 seconds upward and a straight line connecting a point at 980° C. for 11 seconds to a point at 1,240° C. for 1.1 second, a Fr value of not less than 0.25 can be obtained and a higher degree of randomness can be obtained. Furthermore, by heating in a region formed by a straightly elevating line at 980° C. for at least 6 seconds and a straight line connecting a point at 980° C. for 6 seconds to a point at 1,240° C. for 0.6 seconds, a Fr value of more than 0.20 but less than 0.25 can be obtained. By heating outside the latter region, a Fr value will be less than 0.20 and the degree of randomness is lower, resulting in less effect on the expansion.

Relations between the heating temperature and the time can be represented by the following parameter, which seems to be valid up to about 1,200° C.

From the relationships between parameter $P = (3.5 + \log t) \times \log(T - 980)$ and strain due to the irradiation growth, it can be seen that the strain due to the irradiation growth largely depends on the parameter P determined by relations between the temperature and the retention time in the heat treatment. Parameter P is an important factor for determining the crystallographic orientation parameter in the Zr <0001> crystallographic orientation. When the P value is more than 0.5, the strain due to the irradiation growth is suddenly decreased, and when the P value is between 0.5 and 3.5 the strain is gradually decreased. When the P value is more than 3.5, the strain will be substantially constant and nearly zero. Particularly when the P value is 1.5 or more, a remarkable effect can be obtained, and 3.0 to 5 is preferable for the P value.

Test Example 2

Sponge zirconium was melted in vacuum to form alloy ingots of various compositions containing about 1.5% by weight of Sn, 0.10 to 0.50% by weight of Fe, 0 to 0.30% by weight of Ni, and 0.08 to 0.13% by weight of Cr, the balance being substantially Zr. The ingots were hot rolled (700° C.) and annealed (700° C. for 4 hours), retained in the (α+β) phase temperature region (900° C.) or the β-phase temperature region (1,000° C.) for 2 to 3 minutes and then cooled with water. Then, the ingots were subjected to three repetitions of cold rolling (rolling degree for one run: 40%) and successive intermediate annealing at 600° C. for 2 hours to make plates having a thickness of 1 mm.

Corrosion tests were carried out by retaining test pieces in high temperature steam at a pressure of 10.3 MPa and 410° C. for 8 hours and then at 510° C. and the same pressure as above for 16 hours, and measuring a corrosion increment. To investigate influences of material compositions on corrosion in an accelerated manner, the test pieces were heated at 530° C., 620° C. and 730° C. each for two hours.

As to the hydrogen pickup characteristics, such principles can be employed that reaction of Zr with water produces an oxide ($ZrO_2$) and also generates a hydrogen gas at the same time, and moles of water that have reacted with zircaloy can be obtained and also moles of hydrogen gas generated correspondingly can be obtained by measuring a weight increase of test pieces due to the oxidation. Thus, a hydrogen pickup ratio can be determined by measuring the amount of hydrogen in each test piece after the corrosion test by chemical analysis, calculating moles of absorbed hydrogen to obtain a ratio of moles of absorbed hydrogen to that of the generated hydrogen.

Figure 14:
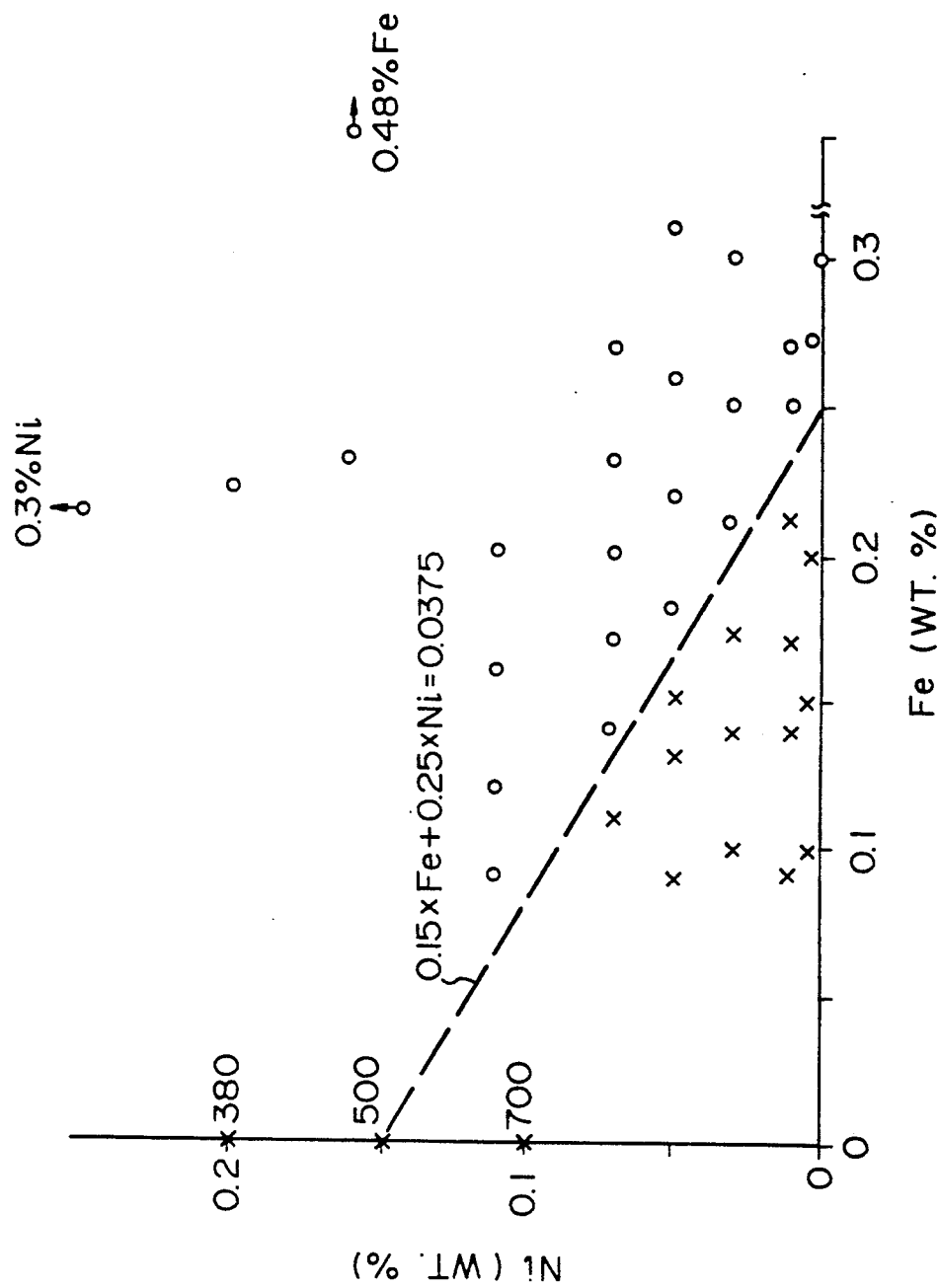
FIG. 14 is a diagram showing relations between Fe content and Ni content on corrosion.

FIG. 14 shows the generation or no generation of nodular corrosion, wherein the round mark "○" shows no generation of nodular corrosion on the surface or side surfaces, irrespective of final annealing temperature, where the corrosion increment was less than 45 mg/dm², and the crossed mark "×" shows generation of nodular corrosion on the surface and the side surfaces, where the corrosion increment exceeded 50 mg/dm². Numerical FIGURES in FIG. 14 show corrosion increments. It can be seen from FIG. 14 that alloy compositions that can prevent generation of nodular corrosion exist in a region on higher Ni and Fe content sides, partitioned by the dotted line in FIG. 14. The dotted line was obtained from such an equation as $0.15 \times$ Fe content (wt. %) $+ 0.25 \times$ Ni content (wt. %) $= 0.375$.

Figure 15:
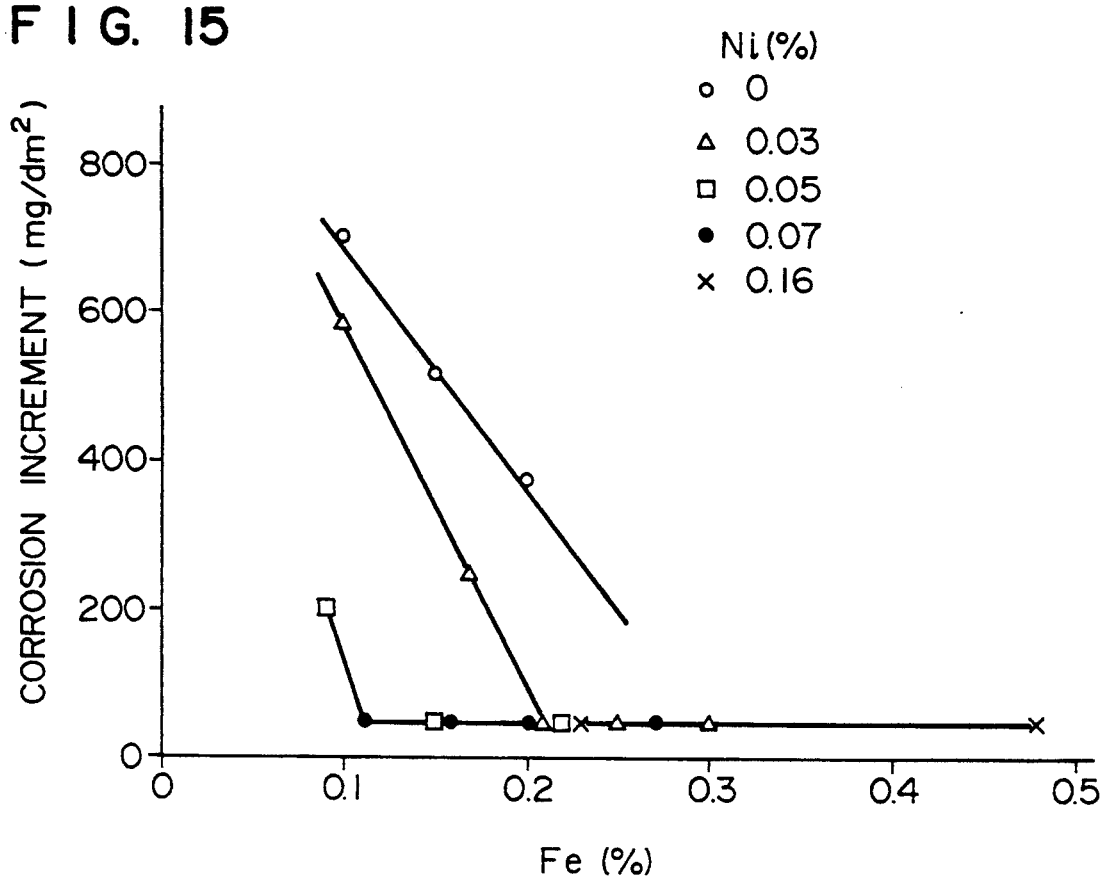
FIG. 15 is a diagram showing relations between Fe content and corrosion increment.

FIG. 15 is a diagram showing influences of Fe and Ni contents on a corrosion increment. As shown in FIG. 15, corrosion in high temperature and high pressure water could be considerably reduced by increasing Fe and Ni contents. Particularly, the corrosion increment could be rapidly reduced by addition of a very small amount of Ni. By addition of at least 0.06% by weight of Ni at about 0.10% by weight of Fe, at least 0.04% by weight of Ni at about 0.15% by weight of Fe and 0.03% by weight of Ni at 0.21% by weight of Fe, the corrosion increment could be made less than 45 mg/dm², and no nodular corrosion was generated.

Figure 16:
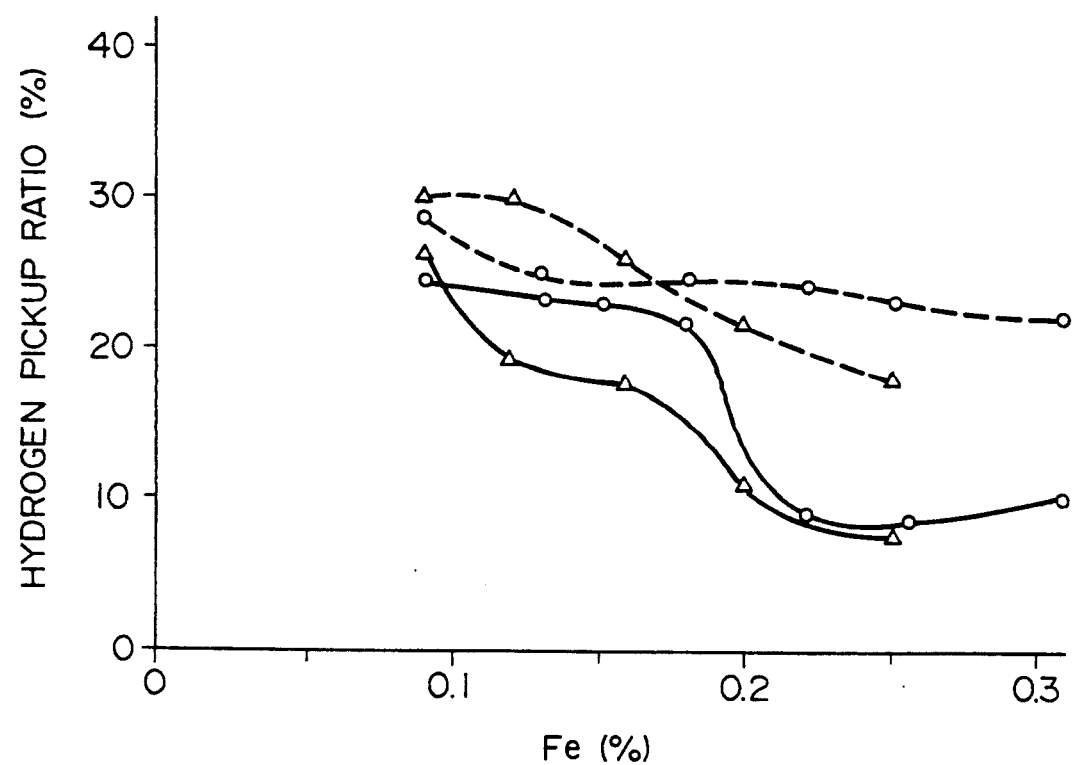
FIG. 16 is a diagram showing relations between hydrogen pickup ratio and Fe content.

FIG. 16 shows influences of Fe content on the hydrogen pickup ratio, where the triangular mark "Δ" shows a hydrogen pickup ratio of alloys containing 0.11% by weight of Ni, and the round mark "○" shows that of alloys containing 0.05% by weight of Ni. In FIG. 16, the dotted lines shows test results of alloys without quenching from the (α+β) phase temperature region or from the β-phase temperature region. Full lines show hydrogen pickup ratios of the alloys with quenching from the (α+β) temperature region in the heat treatment. From FIG. 16 it can be seen that the hydrogen pickup ratio can be made less than 11% by quenching from the (α+β) temperature region, and the hydrogen pickup ratio can be reduced by making the Fe content 0.21% by weight or higher, irrespective of the Ni content.

Figure 17:
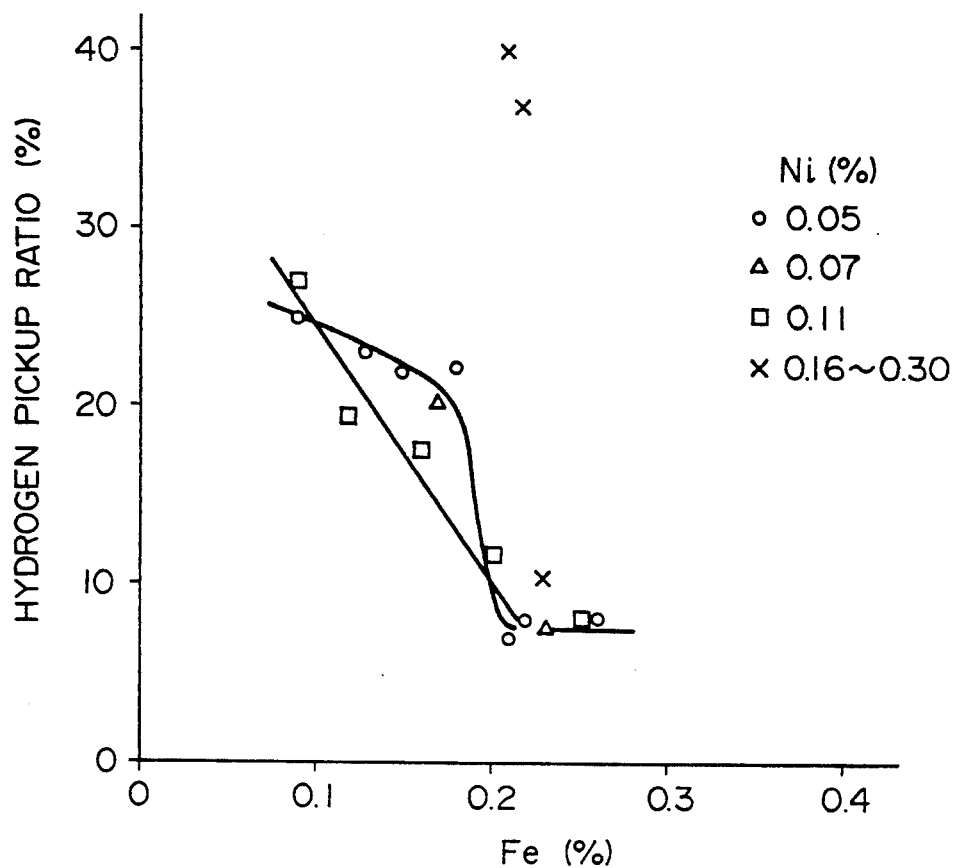
FIG. 17 is a diagram showing relations between hydrogen pickup ratio and Fe content.

FIG. 17 shows influences of Fe and Ni contents on the hydrogen pickup ratio. Below a Ni content of less than 0.16% by weight, the hydrogen pickup ratio is as low as 11%, whereas above 0.2% by weight of Ni, the hydrogen pickup ratio is suddenly increased to reach 40%. Thus, the Ni content must be 0.15% or less by weight. By making the Fe content 0.21% by weight or more, a hydrogen pickup ratio of not more than 10% can be obtained.

Figure 18:
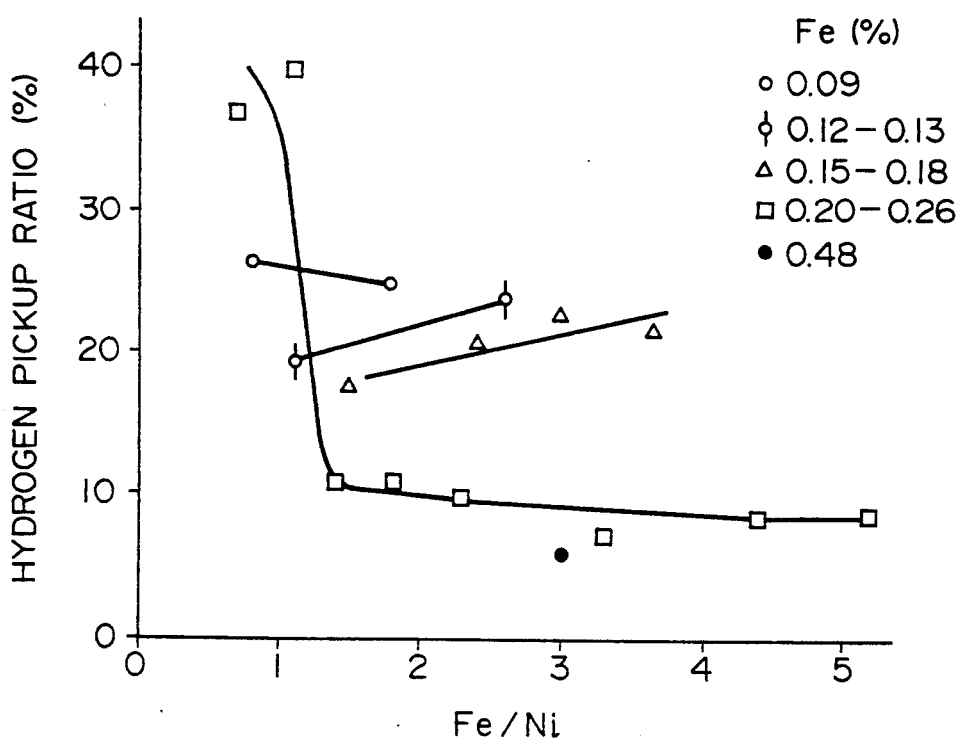
FIG. 18 is a diagram showing relations between hydrogen pickup ratio and (Fe/Ni) ratio.

FIG. 18 is a diagram showing influences of (Fe/Ni) ratios on the hydrogen pickup ratio. As shown in FIG. 18, the round mark "○" each show a Fe content of less than 0.21% by weight and also show no influences of (Fe/Ni) ratios. At Fe contents of 0.20% by weight or higher, the (Fe/Ni) ratio must be 1.4 or more. As explained above, Fe and Ni have quite reversed actions on the effect on the hydrogen pickup ratio, and thus a ratio of these elements is important. Below a Fe content of 0.2% by weight and above a Ni content of 0.2% by weight, there is no correlation between these elements, but when these contents are reversed to each other, a correlation is observable therebetween.

Alloys having increased Fe contents up to 0.48% by weight have a corrosion increment of 43 mg/dm$^2$ and a hydrogen pickup ratio of 12%. From the viewpoints of corrosion resistance and hydrogen pickup, the Fe content must be increased from 0.21% by weight to about 0.5% by weight, so long as the Ni content is less than 0.16% by weight. However, as will be explained later, when the sum total of Ni and Fe contents is as large as 0.64% by weight, the cold plastic workability is abruptly lowered, and thus this is not preferable for the materials that can be made into members having a small thickness by the cold plastic working as explained before. Thus, the sum total of Fe and Ni contents must be less than 0.40% by weight.

Inspection of precipitates in the alloys containing 0.25% by weight of Fe and 0.11% by weight of Ni, quenched from the $(\alpha+\beta)$ phase temperature region, revealed that there was intermetallic compounds of tin and nickel, which are uniformly distributed and precipitated in the $\alpha$-phase zirconium crystal grains. The precipitates were composed of $Sn_2Ni_3$ and had very small grain sizes of about 10 nm. No such precipitates were inspected in the same alloys without quenching from the $(\alpha+\beta)$ phase temperature region.

No precipitates of Sn—Ni intermetallic compounds were found in the quenched alloys from the $(\alpha+\beta)$ phase temperature region, which were subjected to hot plastic working after the quenching.

Example 2

A fuel assembly as shown in FIG. 1 was fabricated. Differences from Example 1 will be given below.

For cladding tubes, zircaloy-2 (Sn: 1-2 wt. %; Fe: 0.05-0.20 wt. %; Cr: 0.05-0.15 wt. %; Ni: 0.03-0.1 wt. %; the balance: Zr) was used. Hot drawn tube shells subjected to final hot plastic working were hardened by passing water into the tube shells in the same manner as in Example 1, whereby a higher solid solution ratio was obtained on the outer surface side than on the inner surface side and a higher corrosion resistance was obtained on the outer surface side. In this Example, a liner of pure Zr was formed on the inner surface side in the same manner as in Example 1. Fuel rods were the same as shown in FIG. 6, where the end plugs 27 were made from the same material as used for the cladding tubes, and after the fuel rods were loaded with nuclear fuel pellets 25 and the end plugs were butt-welded to the fuel rods by laser welding, and the helium gas was sealed therein. Sealing helium gas pressure was about 10 atmospheric pressures and the pellets 25 had an average uranium-235 enrichment of about 4.0% by weight. Hardening treatment of tube shells for the cladding tubes could be carried out in the $(\alpha+\beta)$ phase temperature region at any stage, that is, the tube shell stage over to the stage just before the final cold plastic working. Hardening treatment in the $\beta$-phase temperature region could be carried out in the same manner as that in the $(\alpha+\beta)$ phase temperature region. In any of the $(\alpha+\beta)$ phase and $\beta$-phase temperature regions it was preferable that the hardening be carried out at the tube shell stage, and in the $\beta$-phase temperature region it was preferable to carry out the hardening before the cold plastic working in advance to the final cold plastic working. The annealing temperature after the cold plastic working was preferably 640° to 500° C.

For the channel box, an alloy of the same composition as that for the cladding tubes was used, and after heating at 1,100° C. in the $\beta$-phase temperature region for 10 seconds in the same manner as above, a water spraying treatment was carried out, whereby the same Fr value, Fl value and Ft value shown in Table 2 were obtained. From a neutron irradiation dosage of $3\times10^{22}$ n/cm$^2$, a very small strain such as $0.3\times10^{-4}$ resulted. In this Example, the channel box wa of such a type as shown in FIG. 4, where the wall thickness was larger at the corners than on the surface sides. FIG. 4B shows a recess on the outer surface side and FIG. 4C shows a recess on the inner surface side, formed by mechanical working or chemical etching.

Spacers having the same structure and made from the same material as in Example 1 were used. The material was subjected to hardening in the $(\alpha+\beta)$ phase temperature region or the $\beta$-phase region in the same manner as in Example 1.

Water rods had the same structure and were made from the same material as in Example 1.

With the foregoing structure of the fuel assembly, an average discharge burnup level of 45 GWd/t could be obtained, no nodular corrosion was generated on the cladding tubes, spacers, and water rods, and the channel box had a very small expansion.

Example 3

A fuel assembly as shown in FIG. 1 was fabricated. Differences from Example 2 are given below.

A channel box having a straight structure as shown in FIG. 3 was fabricated from zircaloy-2 in the same manner as in Example 1 and particularly heat treatment was carried out by heating at 1,100° C. for 10 seconds, followed by cooling with water, whereby substantially the same F values as shown in Table 2 were obtained. An average crystal grain size was about 100 μm, and the same treatment after the heat treatment as in Example 1 was carried out.

For cladding tubes, spacers and water rods, the same zircaloy-2 as above was used, and a hardening treatment in the $(\alpha+\beta)$ phase temperature region or the $\beta$-phase temperature region was carried out after the final hot plastic working. End plugs were butt-welded to the ends of each cladding tube and each water rod by TIG welding. The cladding tubes were loaded with nuclear fuel pellets in the same manner as in Example 2, and an average enrichment of uranium-235 for the nuclear fuel was about 3.4% by weight, and the He sealing pressure was about 5 atmospheric pressures.

From the thus fabricated fuel assembly, an average discharge burnup level of 38 GWd/t resulted, and the service duration was about 4.5 years.

Example 4

A fuel assembly as shown in FIG. 1 was fabricated. Differences from Example 3 are given belows.

For cladding tubes and channel box, zircaloy-2 was used, and for spacers and water rods zircaloy-4 (Sn: 1-2 wt. %; Fe: 0.18-0.24 wt. %; Ni: less than 0.01 wt. %; the balance: substantially Zr) was used. The cladding tubes and spacers were hardened in the $\beta$-phase or $(\alpha+\beta)$ phase temperature region and had a high corrosion resistance.

The spacers were of a lattice type as shown in FIG. 9, and were fabricated from hardened plate members by TIG welding. The nuclear fuel pellets had an average uranium-235 enrichment of about 3% and the average discharge burnup level was 33 GWd/t and the service duration was about 4 years.

Since the crystallographic orientations of a channel box as a fuel assembly casing were brought in a random distribution, the channel box is less deformed and can be used in a reactor core for a longer service duration. Corrosion resistances of the individual members of the fuel assembly are increased and the hydrogen pickup ratio is considerably reduced. Thus, a higher burnup level of the fuel assembly can be obtained, contributing to reduction in the amount of spent fuels and to an increase in the reliability of the individual members of the fuel assembly.

While we have shown and described several embodiments in accordance with the present invention, it is understood that the same is not limited thereto, but is susceptible of numerous changes and modifications as known to those skilled in the art. Therefore, we do not wish to be limited to the details shown and described herein, but intend to cover all such changes and modifications as are encompassed by the scope of the appended claims.

What is claimed is:

1. A fuel assembly, which comprises a plurality of fuel rods, each comprising at least one cladding tube made from a zirconium-based alloy and a nuclear fuel loaded therein, a spacer for providing the fuel rods at desired positions, upper and lower tie plates for respectively supporting the fuel rods at their upper and lower ends, at least one water rod, and a channel box made from a zirconium-based alloy for integrating the fuel rods and the at least one water rod into one assembly, the zirconium-based alloy of the cladding tubes including iron and nickel, wherein the cladding tubes have a higher concentration of solid-solution state iron and nickel at outer surfaces of the cladding tubes than at inner surfaces, and material forming the channel box has a crystallographic orientation parameter in the normal-to-plate direction of <0001> crystallographic orientation of 0.25 to 0.50.

2. A fuel assembly according to claim 1, wherein the material forming the channel box has a crystallographic orientation parameter in the normal-to-the-rolling direction of 0.25 to 0.36 and a crystallographic orientation parameter in the longitudinal direction of 0.25 to 0.36.

3. A fuel assembly according to claim 1, wherein the at least one water rod is made of a zirconium-based alloy material, and the material forming the at least one water rod has a crystallographic orientation parameter in the tube thickness direction of <0001> crystallographic orientation of 0.25 to 0.50, a crystallographic orientation parameter in the tube longitudinal direction of 0.25 to 0.36, and a crystallographic orientation parameter in the tube circumferential direction of 0.25 to 0.36.

4. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box, made from a zirconium-based alloy, for integrating the fuel rods and the at least one water rod into one assembly and encasing the assembly of the fuel rods and the at least one water rod, the cladding tubes, the spacer and the channel box each containing 1 to 2% by weight of tin, 0.20 to 0.35% by weight of iron, 0.03 to 0.16% by weight of nickel, the balance being substantially zirconium, the cladding tubes having a higher concentration of solid solution-state iron and nickel at outer surfaces of the cladding tubes than at inner surfaces thereof, and material forming the channel box having a crystallographic orientation parameter in the normal-to-plate direction of <0001> crystallographic orientation, as a Fr value, of 0.25 to 0.50.

5. A fuel assembly according to claim 4, wherein the at least one water rod is provided at a central position of the spacer.

6. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box, made from a zirconium-based alloy, for integrating the fuel rods and the at least one water rod into one assembly and encasing the assembly of the fuel rods and the at least one water rod, the cladding tubes being hardened and having a higher content of solid solution-state tin, iron and nickel at outer surfaces of the cladding tubes than at inner surfaces thereof, and material forming the channel box having a crystallographic orientation parameter in the normal-to-plate direction of <0001> crystallographic orientation, as a Fr value, of 0.25 to 0.50.

7. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box made from a zirconium-based alloy for integrating the fuel rods and the at least one water rod into one assembly and encasing the assembly of the fuel rods and the at least one water rod, material forming the channel box having a crystallographic orientation parameter in the normal-to-plate direction of <00021> crystallographic orientation, a Fr value, of 0.25 to 0.50 and being fixed to the upper tie plate, and the at least one water rod being fixed to the upper tie plate and the lower tie plate at its both ends, respectively, and material forming the at least one water rod having a crystallographic orientation parameter in the normal-to-plate direction of <0001> crystallographic orientation, as a Fr value, of 0.25 to 0.50.

8. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box, made from a zirconium-based alloy, for integrating the fuel rods and the at least one water rod into one assembly and encasing the assembly of the fuel rods and the at least one water rod, the cladding tubes being hardened and having a higher content of solid solution-state iron and nickel at outer surface of the cladding tubes than at inner surfaces thereof, and the channel box being thicker at corners than on sides thereof, and material forming the channel box having a crystallographic orientation parameter in the normal-to-plate direction of <0001> crystallographic orientation, as a Fr value, of 0.25 to 0.50.

9. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box made from a zirconium-based alloy for integrating the fuel rods and the at least one water rod into one assembly and encasing the assembly of the fuel rods and the at least one water rod, the cladding tubes being hardened to a depth not more than a half of a thickness thereof and having a higher content of solid solution-state tin, iron and nickel at outer surfaces of the cladding tubes than at inner surfaces thereof, the channel box being thicker at corners than on sides thereof and thicker at a lower level in the longitudinal direction than at an upper level, and material forming the channel box having a crystallographic orientation parameter in the normal-to-plate direction of <0001> crystallographic orientation, as a Fr value, of 0.25 to 0.50, and the cladding tubes, the spacer and the channel box each containing 1 to 2% by weight of tin, 0.20 to 0.35% by weight of iron, and 0.03 to 0.16% by weight of nickel, the balance being substantially zirconium.

10. A fuel assembly according to claim 9, wherein the at least one water rod contains 1 to 2% by weight of tin, 0.05 to 0.20% by weight of iron, 0.05 to 0.15% by weight of chromium, and 0.03 to 0.1% by weight of nickel, the balance being substantially zirconium, or 1 to 2% by weight of tin, 0.18 to 0.24% by weight of iron and not more than 0.01% by weight of nickel, the balance being substantially zirconium.

11. A fuel assembly, which comprises a plurality of fuel rods, each comprising a cladding tube made from a zirconium-based alloy and a nuclear fuel loaded therein, a spacer for providing the fuel rods at desired positions, an upper tie plate and a lower tie plate for supporting the thus provided fuel rods at their upper ends and their lower ends, at least one water rod, and a channel box made from a zirconium-based alloy for integrating the fuel rods and the at least one water rod into one assembly and encasing the assembly of the fuel rods and the at least one water rod, the cladding tubes being hardened and having a higher content of solid solution-state tin, iron and nickel at outer surfaces of the cladding tubes than at inner surfaces thereof, the channel box being made from a welded straight square cylinder having a substantially uniform thickness at corners and on sides, and material forming the channel box having a crystallographic orientation parameter in the normal-to-plate direction of <0001> crystallographic orientation, as a Fr value, of 0.25 to 0.50, and at least one of the cladding tubes, the spacer, the channel box and the at least one water rod containing 1.2 to 1.7% by weight of tin, 0.07 to 0.20% by weight of iron, 0.05 to 0.15% by weight of chromium, and 0.03 to 0.08% by weight of nickel, the balance being substantially zirconium, or 0.1 to 1.7% by weight of tin, 0.18 to 0.24% by weight of iron and not more than 0.01% by weight of nickel, the balance being substantially zirconium.

12. A fuel assembly according to claim 11, wherein the spacer is a spacer that has been subjected to a hardening treatment by quenching from an $(\alpha+\beta)$ phase region or a $\beta$-phase region after an ultimate hot plastic working.

13. A water rod for a fuel assembly, which is made from a zirconium-based alloy tube containing 1 to 2% by weight of tin, 0.05 to 0.15% by weight of chromium and 0.03 to 0.10% by weight of nickel, the balance being substantially zirconium, and having a crystallographic orientation parameter in the tube thickness direction of <0001> crystallographic direction, as a Fr value, of 0.25 to 0.50, a crystallographic orientation parameter in the tube longitudinal direction, as a Fl value, of 0.25 to 0.36, and a crystallographic orientation parameter in the tube circumferential direction, as a Ft value, of 0.25 to 0.36.

14. A water rod for a fuel assembly according to claim 13, wherein the zirconium-based alloy tube contains 0.05 to 0.15% by weight of chromium.

15. A water rod for a fuel assembly according to claim 13 or 14, wherein the zirconium-based alloy tube has an average crystal grain size of 50 to 300 $\mu$m.

16. A water rod for a fuel assembly, which is made from a zirconium-based alloy tube having a crystallographic orientation parameter in the tube thickness direction of <0001> crystallographic direction, as a Fr value, of 0.25 to 0.50, a crystallographic orientation parameter in the longitudinal direction, as a Fl value, of 0.25 to 0.36, and a crystallographic orientation parameter in the tube circumferential direction, as a Ft value, of 0.25 to 0.36.

17. A fuel assembly according to any one of claims 5-9 and 11, wherein the channel box is a channel box prepared by bending a zirconium-based alloy plate into a channel-type member, welding the channel-type member to another channel-type member, thereby obtaining a square cylindrical member, locally heating the square cylindrical member in a $\beta$-phase temperature region and maintaining the member in the heated state, and forcedly cooling the heated member with a cooling medium, thereby making the forcedly cooled member have a crystallographic orientation parameter in the normal-to-plate direction of <0001> crystallographic orientation, as a Fr value, of 0.25 to 0.50.

18. A fuel assembly according to any one of claims 5-9 and 11, wherein the cladding tubes are cladding tubes prepared by continuously moving either (a) a thick tube shell of the zirconium-based alloy, after a final hot plastic working, or (b) a thin tube shell between the final hot plastic working and a final cold plastic working, in a longitudinal direction, locally heating the outer surface of the tube shell in an $(\alpha+\beta)$ phase or $\beta$-phase temperature region and maintaining the outer surface in the heated state, while cooling the inner surface of the tube shell, and forcedly cooling the outer surface of the tube shell with a cooling medium, thereby hardening the tube shell.

19. A fuel assembly according to any one of claims 5-9, 11 and 12, wherein the spacer has spacer cells each prepared by continuously moving either (a) a thick tube shell of the zirconium-based alloy after a final hot plastic working or (b) a thin tube shell between the final hot plastic working and a final cold plastic working, in the longitudinal direction, locally heating the tube shell in an ($\alpha+\beta$) phase or $\beta$-phase temperature region and maintaining the tube shell in the heated state, and forcedly cooling the tube shell with a cooling medium, thereby hardening the tube shell.

20. A fuel assembly according to any one of claims 5-9, 11 and 12, wherein the spacer has a frame member made from a plate-shaped material, the frame member being a member that has been prepared by locally heating the plate-shaped material in an ($\alpha+\beta$) phase or $\beta$-phase temperature region and maintaining the plate-shaped material in the heated state, and forcedly cooling the material with a cooling medium, thereby hardening the material, the plate-shaped material being in an cell-integrated structure.

21. A fuel assembling according to any one of claims 5-9, 11 and 12, wherein the spacer has lattice cells and a frame member made from a plate-shaped material, the frame member being a member that has been prepared by locally heating the plate-shaped material in an ($\alpha+\beta$) phase or $\beta$-phase temperature region and maintaining the plate-shaped material in the heated state, and forcedly cooling the material with a cooling medium, thereby hardening the material, the plate-shaped material being in an cell-integrated structure.

22. A fuel assembly according to any one of claims 5-9, 11 and 12, wherein the at least one water rod each is a water rod prepared by continuously moving a tube, made from the zirconium-based alloy and subjected to a final cold plastic working, in the longitudinal direction, locally heating the tube in a $\beta$-phase temperature region and maintaining the tube in the heated state, and forcedly cooling the heated part with a cooling medium, thereby making the tube have a crystallographic orientation parameter in the tube thickness direction of $<0001>$ crystallographic direction, as a Fr value, of 0.25 to 0.50, a crystallographic orientation parameter in the tube longitudinal direction, as a Fl value, of 0.25 to 0.36, and a crystallographic orientation parameter in the tube circumferential direction, as a Ft value, of 0.25 to 0.36.

23. A fuel assembly according to claim 1, wherein said crystallographic orientation parameter in the normal-to-plate direction of $<0001>$ crystallographic orientation, of the material forming the channel box, is 0.25 to 0.35.

24. A fuel assembly according to claim 4, wherein said crystallographic orientation parameter in the normal-to-plate direction of $<0001>$ crystallographic orientation, of the material forming the channel box, is 0.25 to 0.35.

25. A fuel assembly according to claim 1, wherein said crystallographic orientation parameter in the normal-to-plate direction of $<0001>$ crystallographic orientation, of the material forming the channel box, is 0.25 to 0.35.

26. A fuel assembly according to claim 7, wherein said crystallographic orientation parameter in the normal-to-plate direction of $<0001>$ crystallographic orientation, of the material forming the channel box, is 0.25 to 0.35.

27. A fuel assembly according to claim 8, wherein said crystallographic orientation parameter in the normal-to-plate direction of $<0001>$ crystallographic orientation, of the material forming the channel box, is 0.25 to 0.35.

28. A fuel assembly according to claim 9, wherein said crystallographic orientation parameter in the normal-to-plate direction of $<0001>$ crystallographic orientation, of the material forming the channel box, is 0.25 to 0.35.

29. A fuel assembly according to claim 11, wherein said crystallographic orientation parameter in the normal-to-plate direction of $<0001>$ crystallographic orientation, of the material forming the channel box, is 0.25 to 0.35.

30. A fuel assembly according to claim 17, wherein the forcedly cooled member is made to have a crystallographic orientation parameter in the normal-to-plate direction of $<0001>$ crystallographic orientation of 0.25 to 0.35.

31. A fuel assembly according to claim 1, wherein the fuel rods are not fixed to the upper tie plate; and wherein crystallographic orientations of material of the channel box and material of the at least one water rod are in substantially random distribution while material of the cladding tubes of the fuel rods is not in substantially random distribution.

32. A fuel assembly according to claim 31, wherein the fuel rods extend through through-holes provided in the upper tie plate.

33. A fuel assembly according to claim 32, wherein said at least one water rod is fixed to the upper tie plate.

34. A fuel assembly according to claim 33, wherein the at least one water rod is made of a zirconium-based alloy material, and the material forming the at least one water rod has a crystallographic orientation parameter in the tube thickness direction of $<0001>$ crystallographic orientation of 0.25 to 0.50, a crystallographic orientation parameter in the tube longitudinal direction of 0.25 to 0.36, and a crystallographic orientation parameter in the tube circumferential direction of 0.25 to 0.36.

35. A fuel assembly according to claim 34, wherein the crystallographic orientation parameter, of the material of the channel box, in the normal-to-plate direction, is greater than crystallographic orientation parameters of the material of the channel box in the longitudinal and normal-to-the-rolling directions.

36. A fuel assembly according to claim 35, wherein the crystallographic orientation parameter of the material forming the at least one water rod, in the tube thickness direction, is greater than crystallographic orientation parameters of the material forming the at least one water rod in the tube longitudinal and tube circumferential directions.

37. A fuel assembly according to claim 34, wherein crystallographic orientation parameters of the material forming the channel box, in the normal-to-plate, longitudinal and normal-to-the-rolling directions, are each substantially equal to 0.33.

38. A fuel assembly according to claim 37, wherein crystallographic orientation parameters of the material forming the at least one water rod, in the tube thickness, longitudinal and tube circumferential directions, are each substantially equal to 0.33.

39. A fuel assembly according to claim 2, wherein crystallographic orientation parameters in each of the normal-to-plate, normal-to-the-rolling, and longitudinal directions is 0.30 to 0.35.

40. A water rod according to claim 16, wherein crystallographic orientation parameters in each of the tube thickness direction, the longitudinal direction and the tube circumferential direction are 0.30 to 0.35.

41. A water rod according to claim 16, wherein crystallographic orientation parameters of the material forming the at least one water rod, in the tube thickness, longitudinal and tube circumferential directions, are each substantially equal to 0.33.

* * * * *